Figure 1:
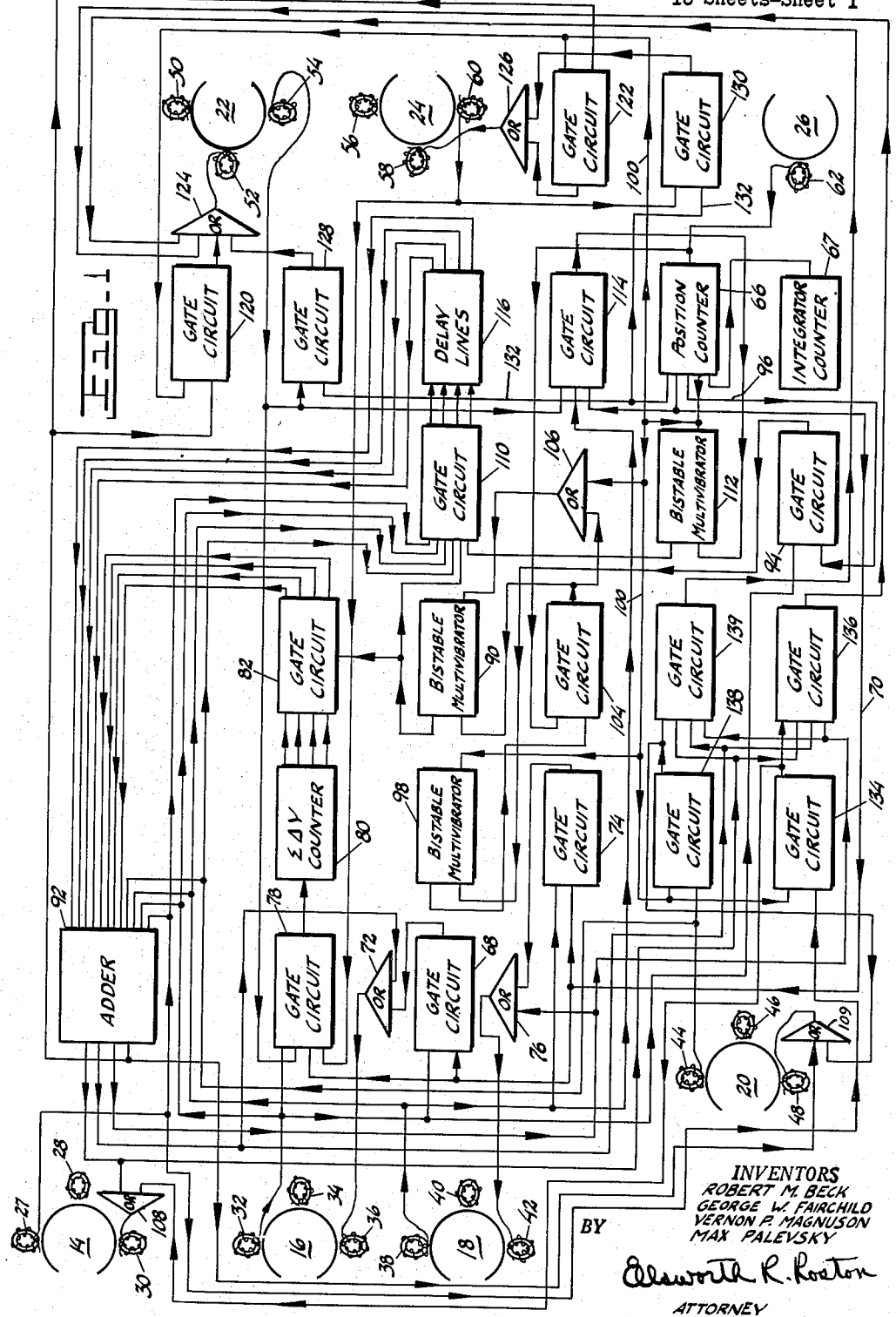

Nov. 7, 1961

R. M. BECK ET AL 3,007,641

DIGITAL DIFFERENTIAL ANALYZERS

Filed Feb. 15, 1954

13 Sheets-Sheet 9

INVENTORS
ROBERT M. BECK
GEORGE W. FAIRCHILD
VERNON P. MAGNUSON
BY MAX PALEVSKY

Ellsworth R. Roston

ATTORNEY

Nov. 7, 1961

R. M. BECK ET AL 3,007,641

DIGITAL DIFFERENTIAL ANALYZERS

Filed Feb. 15, 1954

13 Sheets-Sheet 12

| 4 | 3 | 2 | 1 | Y or R |
|---|---|---|---|--------|
| 1 | 1 | 0 | 0 | +9 |
| 1 | 0 | 1 | 1 | +8 |
| 1 | 0 | 1 | 0 | +7 |
| 1 | 0 | 0 | 1 | +6 |
| 1 | 0 | 0 | 0 | +5 |
| 0 | 1 | 1 | 1 | +4 |
| 0 | 1 | 1 | 0 | +3 |
| 0 | 1 | 0 | 1 | +2 |
| 1 | 0 | 0 | 0 | +1 |
| 0 | 0 | 1 | 1 | 0 |
| 1 | 1 | 0 | 1 | 0 |
| 1 | 1 | 0 | 0 | -1 |
| 1 | 0 | 1 | 1 | -2 |
| 1 | 0 | 1 | 0 | -3 |
| 1 | 0 | 0 | 1 | -4 |
| 1 | 0 | 0 | 0 | -5 |
| 0 | 1 | 1 | 1 | -6 |
| 0 | 1 | 1 | 0 | -7 |
| 0 | 1 | 0 | 1 | -8 |
| 0 | 1 | 0 | 0 | -9 |

| 4 | 3 | 2 | 1 | Y or R |
|---|---|---|---|--------|
| 1 | 0 | 0 | 1 | +9 |
| 1 | 0 | 0 | 0 | +8 |
| 0 | 1 | 1 | 1 | +7 |
| 0 | 1 | 1 | 0 | +6 |
| 0 | 1 | 0 | 1 | +5 |
| 0 | 1 | 0 | 0 | +4 |
| 0 | 0 | 1 | 1 | +3 |
| 0 | 0 | 1 | 0 | +2 |
| 0 | 0 | 0 | 1 | +1 |
| 0 | 0 | 0 | 0 | 0 |
| 1 | 1 | 1 | 1 | -1 |
| 1 | 1 | 1 | 0 | -2 |
| 1 | 1 | 0 | 1 | -3 |
| 1 | 1 | 0 | 0 | -4 |
| 1 | 0 | 1 | 1 | -5 |
| 1 | 0 | 1 | 0 | -6 |
| 1 | 0 | 0 | 1 | -7 |
| 1 | 0 | 0 | 0 | -8 |
| 0 | 1 | 1 | 1 | -9 |

INVENTORS
ROBERT M. BECK
GEORGE W. FAIRCHILD
VERNON P. MAGNUSON
BY MAX PALEVSKY

Ellsworth R. Roston

ATTORNEY

| $R_F=$ | $X_4X_3X_2X_1$ | $C_C$ | $Y_4Y_3Y_2Y_1=$ | | $O_4O_3O_2O_1=$ | $R_N$ | $dz$ |
|---|---|---|---|---|---|---|---|
| +9 | 1111 | 0 | 1000 | -8 | 0111 | 4 | +1 |
| +8 | 1110 | 0 | 1000 | -8 | 0110 | 3 | +1 |
| +7 | 1101 | 0 | 1000 | -8 | 0101 | 2 | +1 |
| +6 | 1100 | 0 | 1000 | -8 | 0100 | 1 | +1 |
| +5 | 1011 | 0 | 1000 | -8 | 0011 | 0 | +1 |
| +4 | 1010 | 0 | 1101 | -3 | 0111 | 4 | 0 |
| +3 | 1001 | 0 | 1101 | -3 | 0110 | 3 | 0 |
| +2 | 1000 | 0 | 1101 | -3 | 0101 | 2 | 0 |
| +1 | 0111 | 0 | 1101 | -3 | 0100 | 1 | 0 |
| +0 | 0110 | 0 | 1101 | -3 | 0011 | 0 | 0 |
| +4 | 0100 | 1 | 0011 | +3 | 0111 | 4 | 0 |
| +3 | 0011 | 1 | 0011 | +3 | 0110 | 3 | 0 |
| +2 | 0010 | 1 | 0011 | +3 | 0101 | 2 | 0 |
| +1 | 0001 | 1 | 0011 | +3 | 0100 | 1 | 0 |
| +0 | 0000 | 1 | 0011 | +3 | 0011 | 0 | 0 |
| -1 | 1111 | 0 | 1000 | +8 | 0111 | 4 | -1 |
| -2 | 1110 | 0 | 1000 | +8 | 0110 | 3 | -1 |
| -3 | 1101 | 0 | 1000 | +8 | 0101 | 2 | -1 |
| -4 | 1100 | 0 | 1000 | +8 | 0100 | 1 | -1 |
| -5 | 1011 | 0 | 1000 | +8 | 0011 | 0 | -1 |

FIG. 17

| $R_F=$ | $X_4X_3X_2X_1$ | $C_C$ | $Y_4Y_3Y_2Y_1=$ | | $O_4O_3O_2O_1=$ | $R_N$ | $dz$ |
|---|---|---|---|---|---|---|---|
| +3 | 1001 | 0 | 1011 | -5 | 0100 | +1 | +1 |
| +2 | 1000 | 0 | 1011 | -5 | 0011 | +0 | +1 |
| +1 | 0111 | 0 | 1101 | -3 | 0100 | +1 | 0 |
| +0 | 0110 | 0 | 1101 | -3 | 0011 | +0 | 0 |
| +1 | 0001 | 1 | 0011 | +3 | 0100 | +1 | 0 |
| +0 | 0000 | 1 | 0011 | +3 | 0011 | +0 | 0 |
| -1 | 1111 | 0 | 0101 | +5 | 0100 | +1 | -1 |
| -2 | 1110 | 0 | 0101 | +5 | 0011 | +0 | -1 |

FIG. 18

INVENTORS
ROBERT M. BECK
GEORGE W. FAIRCHILD
VERNON P. MAGNUSON
MAX PALEVSKY
BY Ellsworth R. Roston
ATTORNEY United States Patent Office 3,007,641
Patented Nov. 7, 1961

3,007,641
DIGITAL DIFFERENTIAL ANALYZERS
Robert M. Beck and George W. Fairchild, Inglewood, Vernon P. Magnuson, Gardena, and Max Palevsky, Los Angeles, Calif., assignors to The Bendix Corporation, a corporation of Delaware
Filed Feb. 15, 1954, Ser. No. 410,231
4 Claims. (Cl. 235—152)

This invention relates to digital differential analyzers and more particularly to an analyzer for utilizing decimal digits to enhance its ease of operation and for facilitating scaling in the decimal system.

In co-pending application Serial No. 217,478, filed March 26, 1951, now Patent No. 2,900,134, by Floyd G. Steele and William S. Collison, a digital differential analyzer is disclosed for solving complex differential problems by digital steps. The analyzer has the advantages of both digital computers and differential analyzers. The analyzer obtains the advantage of differential analyzers in that it is relatively small in construction. The analyzer also has the advantage of digital computers in its speed and accuracy of operation. By combining these advantages, a computer is obtained which is able to solve complex differential equations even though it is housed in a cabinet smaller than a desk.

The digital differential analyzers now in use operate in the binary system to obtain the solution of digital problems. These systems have been entirely satisfactory from the standpoint of operation. However, operators of the machine have expressed some desire for an analyzer which will operate on a decimal basis. It has been the opinion of these people that a machine operating on a decimal basis can be initially coded relatively easily and that the results obtained during and after the solution of a problem can also be read and digested easily.

One of the difficulties in converting from a binary system to a decimal system results from problems of scaling. In the binary system the scale progresses in the relationship 1, 2, 4, 8, 16, 32, 64, 128, 256, 512, 1024, etc., for successive digit positions. In the decimal system, the scale progresses in the relationship 1, 10, 100, 1,000, etc., for successive digit positions. As can be seen, the scale values in the decimal system are spaced further apart numerically than the scale values in the binary system. This spread of scale values in the decimal system may restrict the full utilization of the digital differential analyzer under certain conditions.

This invention provides a digital differential analyzer for converting binary information into decimal information and for solving differential problems on the basis of the decimal information. The analyzer also includes members for providing a multiplication by such integers as "2" or "5." The analyzer provides such multiplications by the inclusion of a relatively few components in addition to these required to produce the decimal operation. By providing a multiplication by such integers as "2" or "5," the scale in the decimal system is able to progress in the relationship 1, 2, 5, 10, 20, 50, 100, 200, 500, 1,000, etc. In this way, the scale values are able to approach the scale values in the binary system in closeness of numerical spacing.

An object of this invention is to provide a digital differential analyzer which operates in digital steps to obtain a solution of complex differential problems.

Another object is to provide an analyzer of the above character which is capable of being coded and of operating on a decimal basis to solve differential problems.

A further object is to provide an analyzer of the above character for multiplying any particular decimal value by such integers as "2" or "5" to increase the scale values of a decimal machine so that it approaches the scale values of a binary machine.

Still another object is to provide an anlyzer of the above character in which only a relatively few components are required to be included in an analyzer operating on a decimal basis to provide multiplications of any output value by such integers as "2" or "5."

A still further object is to provide a method of solving differential problems in digital steps and on a decimal basis and of multiplying the output values by such integers as "2" or "5."

Other objects and advantages will be apparent from a detailed description of the information and from the appended drawings and claims.

Figure 8:
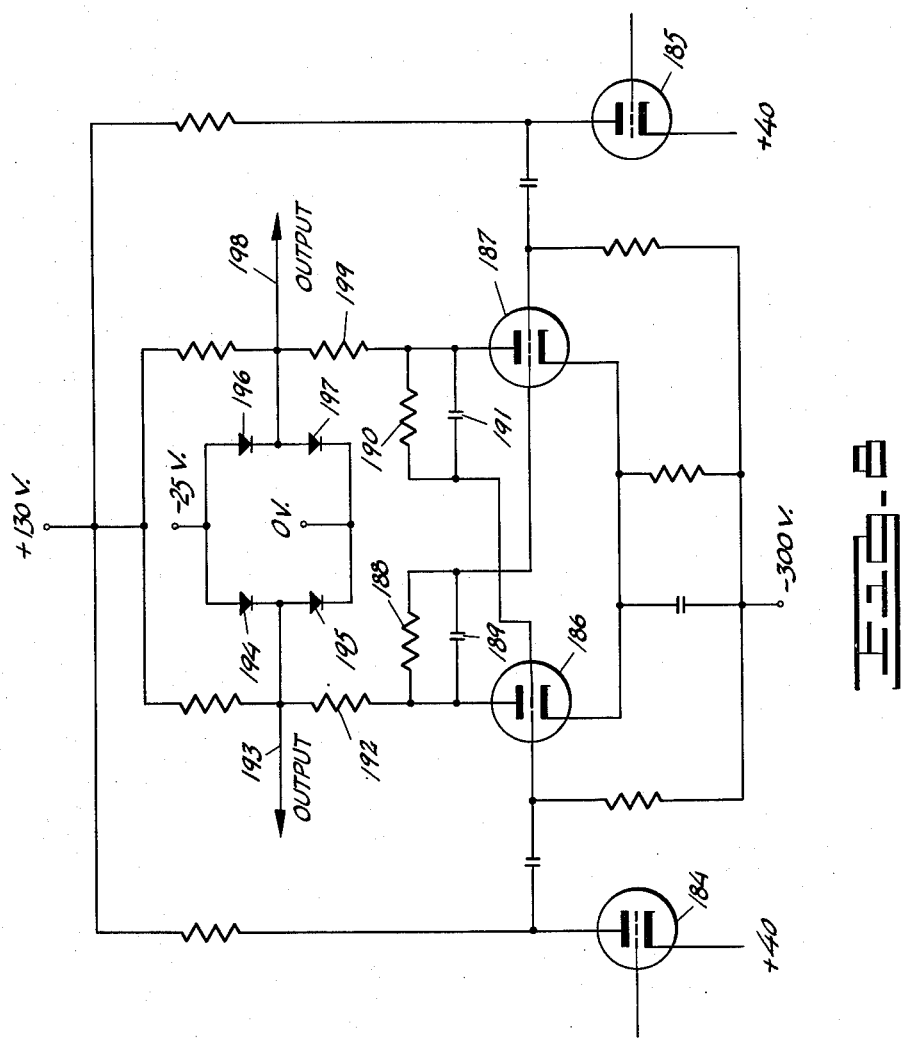
Figure 9:
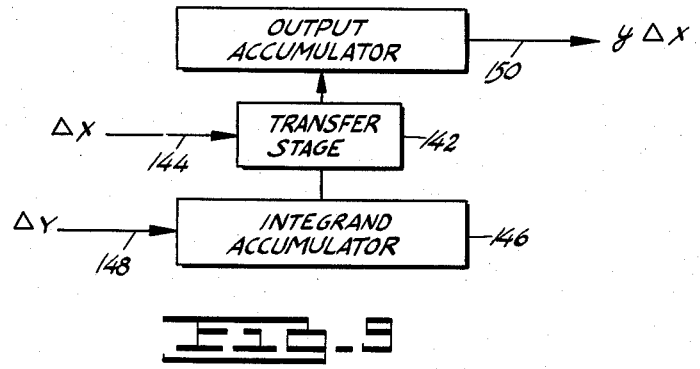
Figure 10:
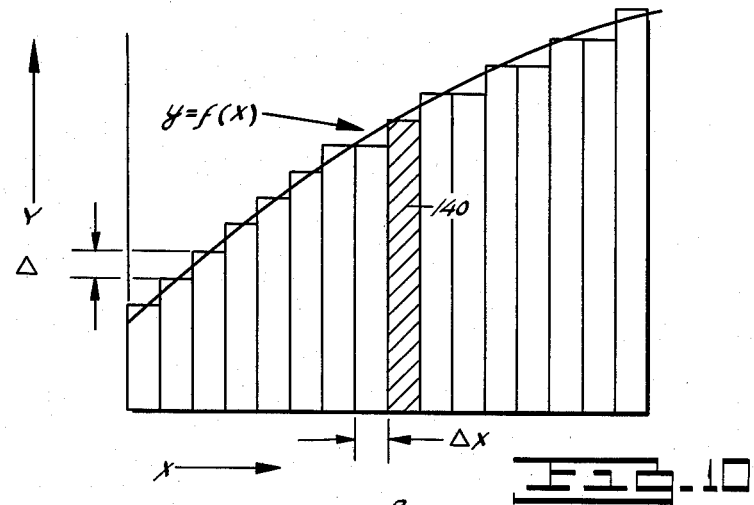
Figure 11:
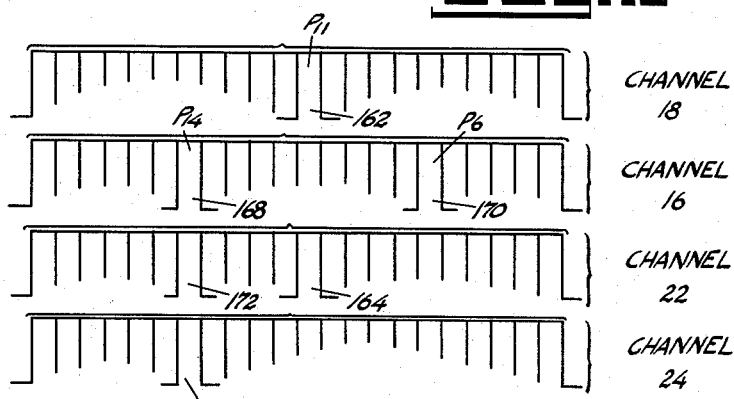
Figure 12:
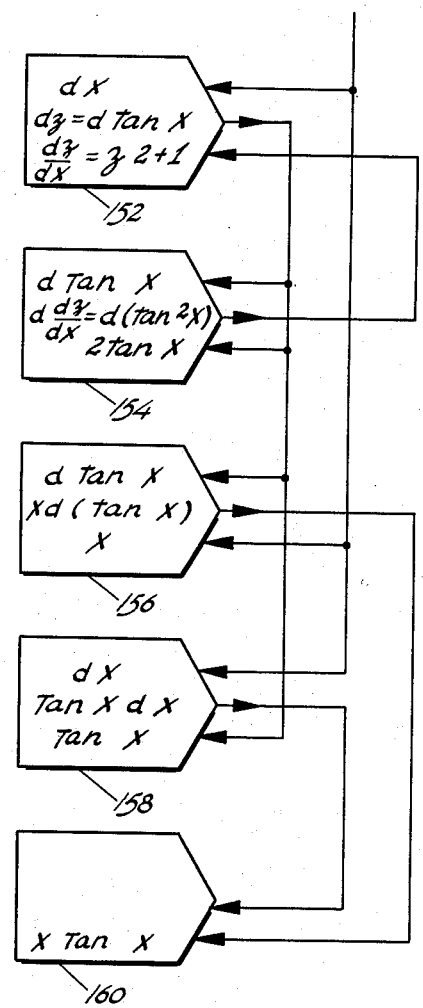
Figure 13:
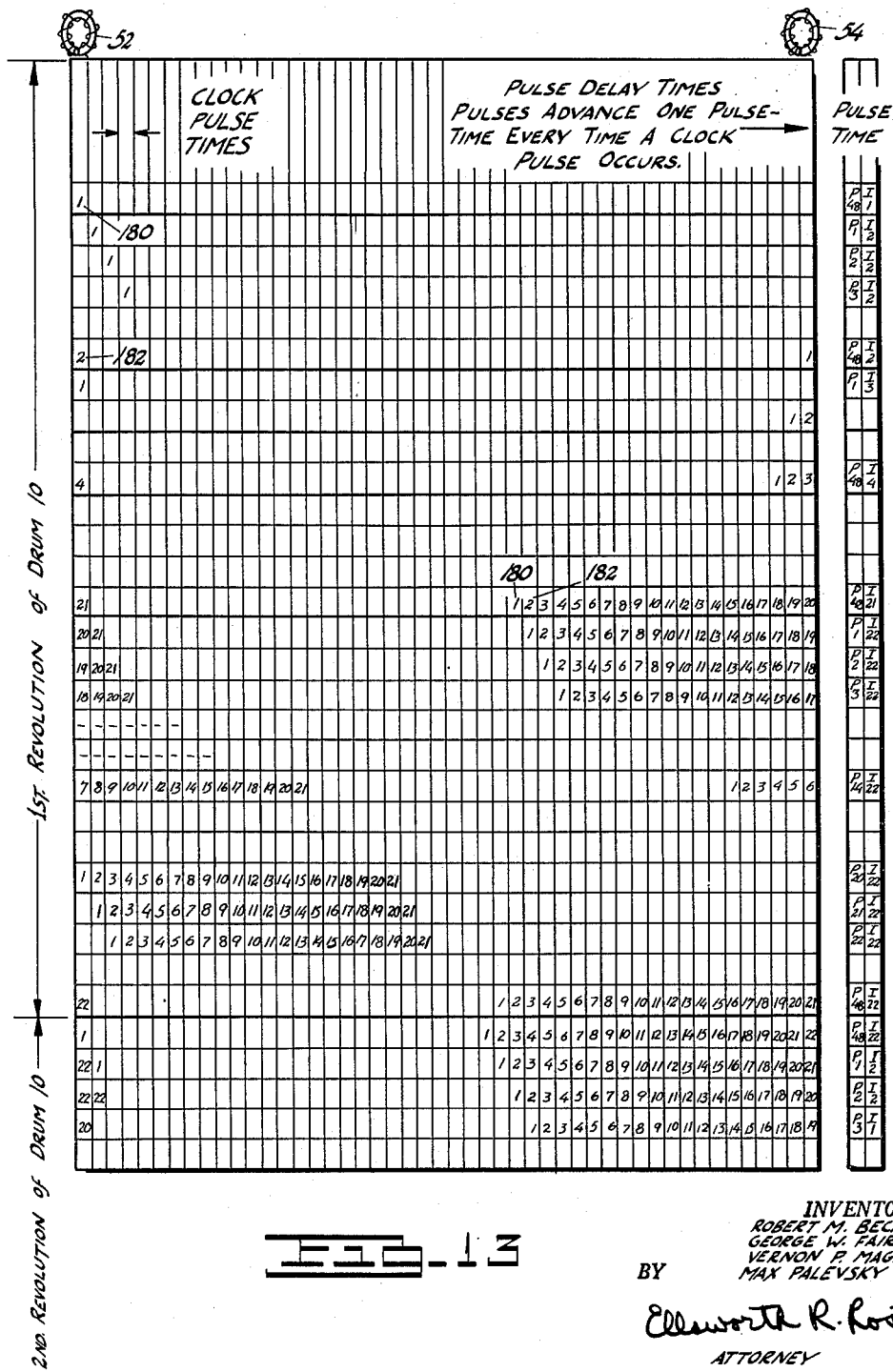
Figures 14, 15, 16:
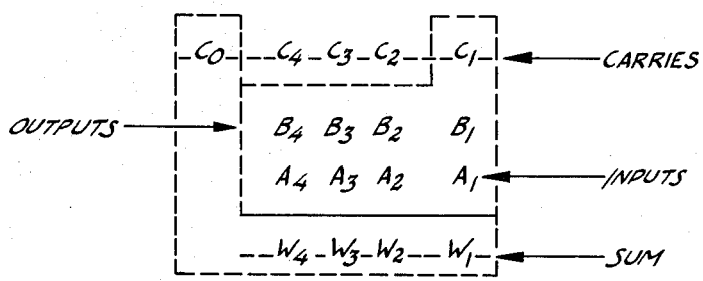

In the drawings:
FIGURE 1 is a simplified block diagram which schematically illustrates a digital differential analyzer forming one embodiment of this invention;
FIGURES 2, 3, 4, 5, 6, and 7 are schematic diagrams, partly in block form and partly in perspective, illustrating in some detail the digital differential analyzer in FIGURE 1;
FIGURE 8 is a circuit diagram of a flip-flop unit which forms a basic stage of the analyzer shown in FIGURE 1 and of the analyzer shown in FIGURES 2 to 7, inclusive;
FIGURE 9 is a block diagram illustrating the operation of one of the integrators forming part of the digital differential analyzer shown in FIGURE 1 and in FIGURES 2 to 7, inclusive;
FIGURE 10 is a curve illustrating the operation of an integrator such as the integrator shown in FIGURE 9;
FIGURE 11 is a chart which illustrates how different parts of an integrator such as that shown in FIGURE 9 are coded to control the operation of the integrator;
FIGURE 12 is a schematic diagram illustrating the relationship between different integrators forming the digital differential analyzer shown in FIGURE 1 and in FIGURES 2 to 7, inclusive, when the analyzer is solving a particular problem;
FIGURE 13 is a chart illustrating the operation of certain of the components forming part of the analyzer shown in FIGURE 1 and in FIGURES 2 to 7, inclusive;
FIGURE 14 is a chart which illustrates the operation of certain of the components shown in FIGURES 2 to 7, inclusive;
FIGURE 15 is a chart illustrating the operation of certain of the components in analyzers now in use to provide a comparison with the chart shown in FIGURE 14; and
FIGURES 16, 17, and 18 are charts which illustrate the operation of various components shown in FIGURES 2 to 7, inclusive.

A simplified block diagram is shown in FIGURE 1 of an analyzer for solving differential problems by digital steps. The analyzer includes a drum 10 (schematically shown in FIGURES 2 to 7, inclusive) adapted to be rotated by a suitable motor (not shown). A thin coating 12 (FIGURE 2) of magnetic material is applied to the periphery of the drum. The coating 12 can be considered as being divided into a plurality of annular channels 14, 16, 18, 20, 22, 24 and 26. These channels are shown schematically in FIGURE 1 in separated relationship for purposes of convenience. Each of the channels is separated by by a sufficient distance from its adjacent channel so as to be substantially unaffected by the magnetic information provided in the adjacent channel.

The circumferential distance of each channel may be considered as being divided into a plurality of positions. Each of the positions is sufficiently separated from its adjacent positions to receive a different magnetization than that provided on the adjacent positions. For example, approximately 1160 equally spaced pulse positions may be provided in each channel when the drum has a radius of approximately four inches.

A plurality of toroidal coils are positioned adjacent to each of the channels 14, 16, 18, 20, 22, 24 and 26. For example, coils 27, 28 and 30 are provided in contiguous relationship to the channel 14. These coils are shown schematically in FIGURE 1. Similarly, coils 32, 34 and 36; coils 38, 40 and 42; coils 44, 46 and 48; coils 50, 52 and 54; and coils 56, 58 and 60 are associated with the channels 16, 18, 20, 22 and 24, respectively. A single coil 62 is disposed adjacent the channel 26.

The coils 27 and 30 are effectively separated from each other by approximately 104 pulse positions, and the coil 28 is disposed at an intermediate position between the coils 27 and 30. The coil 30 is adapted to provide signals in a pattern dependent on the operation of the digital differential analyzer and to induce the corresponding magnetic pattern on the drum 10 as the drum rotates. The pattern induced on the drum 10 by the coil 30 is of the binary form in which a magnetization in one circumferential direction indicates one value and a magnetization in the other direction indicates a second value.

The coil 27 is adapted to pick up the changes in the direction of magnetization in the channel 14 as the drum rotates. The coil 28 is adapted to produce a substantially constant signal for returning the direction of magnetization on the drum to that representing a value of "0" after the magnetic pattern on the drum has been converted into a corresponding electrical pattern by the coil 27.

The coils 32, 34 and 36 are separated from one another by distances corresponding to the distances between the coils 27, 28 and 30 and are adapted to perform functions similar to those performed by the coils 27, 28 and 30, respectively. The coils 38, 40 and 42 and the coils 44, 46 and 48 are also separated in the channels 18 and 20 in a similar manner to the separation of the coils in the channel 14 and are adapted to perform functions corresponding to those performed by the coils 27, 28 and 30, respectively.

The coils 52 and 58 are adapted to operate in a manner similar to the coil 30 to provide a magnetic pattern in the channels 22 and 24, respectively, in a pattern dependent upon the problem to be solved. The coils 52 and 58 are effectively separated from the coils 54 and 60, respectively, by approximately 49 pulse positions during the operation of the analyzer to obtain the solution of a mathematical problem.

The coils 54 and 60 are adapted to produce signals in accordance with the magnetic pattern provided in their respective channels by the coils 52 and 58. The coils 50 and 56 are adapted to operate in a manner similar to the coil 28 to produce a "zero" direction of magnetization in the channels 22 and 24, respectively, after the patterns provided by the coils 52 and 58 have been utilized by the coils 54 and 60, respectively.

The coil 62 is adapted to produce a cycle of a signal approximating a sine wave as each pulse position in the channel 26 moves past the coil. The coil 62 produces sinusoidal signals because of the magnetic pattern permanently provided in the channel 26. This pattern remains constant regardless of the problem to be solved.

A counter 66 is connected to the coil 62 to count the cycles of the sine waves in the channel 26 as the drum rotates. The counter 66 is formed from a plurality of multivibrators connected in cascade arrangement and is adapted to count successive sine signals in a numerical range from "1" to "48." Upon each count of "48," the counter 66 is adapted to return to its initial state for the commencement of a new count. As will be disclosed in detail hereinafter, a new integrator is presented for computation upon the completion of each count of "48."

Similarly, a counter 67 is formed from a plurality of multivibrators in cascade arrangement. The counter 67 is connected to the counter 66 to count the number of times that a full count is obtained in the counter 66. For example, the counter 67 may count up to 22 full counts in the counter 66 before returning to its initial state for the initiation of a new count. In this way, the counters 66 and 67 divide the drum 10 into 22 integrator sections each having 48 pulse positions.

As schematically shown in FIGURE 1, the output signals induced in the coil 32 are introduced to a gate circuit 68, which also has signals applied to it through a line 70 from the counter 66. The output signals from the gate circuit 68 are in turn applied through an "or" network 72 to the coil 36. Similarly, a gate circuit 74 receives signals from the coil 38 and through the line 70 from the counter 66. The output terminal of the gate circuit 74 is connected to an input terminal of an "or" network 76 having its output terminal connected to the coil 42.

The coil 32 is not only connected to the gate circuit 68 but also to an input terminal of a gate circuit 78 having other input terminals connected to the coils 54 and 60 and through the line 70 to the counter 66. The output from the gate circuit 78 passes to a counter 80 formed from a plurality of multivibrators in cascade arrangement. The output from the counter 80 is in turn applied to input terminals of a plurality of gate circuits which are designated in FIGURE 1 by a single block at 82 and which have other input terminals connected to the plate of the left tube in a multivibrator 90. The output terminals of the gate circuits 82 are connected to input terminals of an adder 92.

The signals from the coil 32 are also introduced to an input terminal of a gate circuit 94 having another input terminal connected through a line 96 to the counter 66. The output from the gate circuit 94 is applied to the grid of the left tube in a bistable multivibrator 98, the grid of the right tube in the multivibrator being connected through a line 100 to the counter 66. The plate of the left tube in the multivibrator 98 is connected to an input terminal of a gate circuit 104, another input terminal of which is connected to the coil 62. The signals passing through the gate circuit 104 are introduced directly to the grid of the left tube in the multivibrator 90 and through an "or" network 106 to the grid of the right tube in the multivibrator. Signals also pass from the counter 66 through the line 100 and the "or" network 106 to the grid of the right tube in the multivibrator 90.

In addition to receiving the signals from the gate circuit 82, the adder 92 also receives signals from the coils 27, 32, 38 and 44. The signals from the gate circuits 82 are arithmetically combined in the adder 92 with the signals from the coils 27, 32, 38 and 44. The results obtained are applied through an "or" network 108 to the coil 30, through the "or" network 72 to the coil 36, through the "or" network 76 to the coil 42, and through an "or" network 109 to the coil 48.

The pulses induced in the coils 27, 32, 38 and 44 are also applied to input terminals of gate circuits designated in FIGURE 1 by a single block at 110. Connections are also made to input terminals of the gate circuit 110 from the plate of the left tube in the multivibrator 90 and from the plate of the left tube in a multivibrator 112. Connections are respectively made to the grids of the left and right tubes in the multivibrator 112 from a gate circuit 114 and through the line 100 from the counter 66. The gate circuit 114 in turn receives signals from the coils 38 and 54 and through the line 70 from the counter 66.

The output signals from the gate circuits 110 are introduced to the adder 92 through suitable delay lines, designated in FIGURE 1 at 116, for combination with the signals from the coils 27, 32, 38 and 44. The delay lines 116 may be bistable multivibrators to delay by one pulse position the information from the gate circuits 110. The output signals obtained by the adder 92 are applied to the coils 30, 36, 42 and 48 through the "or" networks 108, 72, 76 and 109, respectively.

The output signals passing from the adder 92 to the coil 48 are also applied to gate circuits 120 and 122, each of which has an input terminal connected through the line 100 to the counter 66. The output signals from the gate circuits 120 and 122 respectively pass through "or" networks 124 and 126 for introduction to the coils 52 and 58. The "or" networks 124 and 126 also respectively receive signals from gate circuits 128 and 130. Connections are made to input terminals of the gate circuit 128 from the coil 54 and through a line 132 from the counter 66. Similarly, input terminals of the gate circuit 130 are connected to the coil 60 and line 132.

The coil 27 is connected directly to an input terminal of a gate circuit 134 having another input terminal connected through the line 100 to the counter 66. The output from the gate circuit 134 is introduced to the "or" network 108 and is also introduced to a gate circuit 136 to control the operation of the gate circuit 136 in assimilating information introduced to the gate circuit 136 from various output terminals of the adder 92. The output from the gate circuit 136 through the "or" network 124 is introduced to the coil 52.

Similarly, a gate circuit 138 receives a voltage from the line 100 and from the coil 44. The output from the gate circuit 138 passes to the "or" network 109 for recordation by the coil 48 in the channel 20. The output from the gate circuit 138 also controls the operation of a gate circuit 139 in assimilating information introduced to the gate circuit 139 from various output terminals of the adder 92. A connection is made from the output terminal of the gate circuit 139 to an input terminal of the "or" network 124.

The digital differential analyzer as illustratively described above in simplified form is adapted to provide the solution of differential equations. For example, it may provide the solution of the problem of evaluating the integral of a general equation $y=f(x)$ so as to obtain a function $\int y dx = \int f(x) dx$, where $f(x)$ represents a function of $x$ and $\int f(x) dx$ represents the integral of the function. If a curve $y=f(x)$ is plotted with $x$ as the abscissa and $y$ as the ordinate the analyzer obtains the relationship $\int y dx = \int f(x) dx$ by computing the area under the curve $y=f(x)$. By determining the area under the curve $y=f(x)$, the analyzer performs electronically operations that may sometimes be performed mentally by a skilled mathematician when the problem to be solved is relatively simple.

The analyzer obtains the value of the function $\int y dx = \int f(x) dx$ by producing small increments of $x$. These increments may be represented by the symbol $\Delta x$. For each $\Delta x$ increment, the analyzer determines the value of $y$ and obtains the product $y\Delta x$. This product $y\Delta x$ approximates the area under the curve $y=f(x)$ for each $\Delta x$ increment, as indicated in FIGURE 10 by the shaded area 140 for a particular $\Delta x$ increment. If the product $y\Delta x$ is obtained for successive $\Delta x$ increments and if all of the $y\Delta x$ increments are added together, the area under the interval of the curve representing $f(x)$ from $x_0$ to $x$ may be approximated. A relatively accurate approximation may be obtained by decreasing the value of each $\Delta x$ increment.

An integrator for determining the $y\Delta x$ increments and for storing the cumulative values of these increments is shown in FIGURE 9. The integrator includes a transfer stage 142 for obtaining $\Delta x$ increments at periodic intervals through a line 144. The integrator also has an integrand accumulator 146 for storing the value of the dependent quantity $y$ and for receiving $\Delta y$ increments through a line 148 from its own and from other integrators so as to vary the value of $y$ in accordance with the function $y=f(x)$. An output accumulator 150 is provided to receive $y\Delta x$ increments, to combine each $y\Delta x$ increment with the previous increments and to deliver the cumulative value obtained to another integral accumulator or transfer stage while holding the remainder in store. A detailed explanation of this will be given hereafter.

The interrelationship between different integrators is illustrated in FIGURE 12 for a particular problem. This problem starts with a differential equation represented by $$\frac{dy}{dx}=y^2+1$$

As is mathematically known, the differential solution of this problem indicates that $y=\tan x$. The interrelationship illustrated in FIGURE 12 utilizes this solution to generate the function tan $x$ which is accumulated in the register of an output integrator. The integrators involved in the generation of the function tan $x$ are indicated in FIGURE 12 by blocks 152, 154, 156, 158 and 160. In each integrator, the introduction of the $\Delta x$ increments constituting changes in the independent variable quantity for the integrator is indicated by a line extending into the upper right position in the block. The $\Delta y$ increments are introduced into the integrator through a line or a plurality of lines extending into the lower right portion of the block representing the integrator. The output of the integrator is obtained from a line extending from an intermediate position at the right side of the appropriate block.

As will be seen in FIGURE 12, $\Delta x$ increments of the independent variable for a particular integrator may be obtained from the output of another integrator. For example, in FIGURE 12, the $\Delta x$ increments for the integrators 154 and 156 are obtained from the output of the integrator 152. Similarly, $\Delta y$ increments for a particular integrator may be obtained from the output of other integrators as well as from the output of the integrator itself. For example, $\Delta y$ increments for the integrators 154 and 158 are obtained from the output of the integrator 152.

The $\Delta y$ and $\Delta x$ increments for each integrator are actually determined from a coded pattern provided in the channels 16 and 18, respectively. As previously disclosed, the pulse positions in each channel are subdivided into 22 integrator sections each having 48 pulse positions. The first 22 positions in each integrator section in the channel 18 are coded to indicate a $\Delta x$ increment. Since the first 22 positions in the channel 18 for each integrator section correspond in number to the 22 integrators in the analyzer, each integrator can receive a $\Delta x$ increment from the output of any of the other integrators. This can be effectuated by providing a pulse in the channel 18 in a particular one of the first 22 positions for the integrator.

For example, the $\Delta x$ increments for the integrator 154 in FIGURE 12 would be coded in a particular one of the 22 positions in the channel 18. As will be disclosed in detail hereinafter, the particular position corresponds to the time at which the output from the integrator 152 appears on the coils 54 and 60. In FIGURE 11, a pulse 162 is shown as being recorded in the channel 18 in the 11th pulse position for a particular integrator section.

A pulse in the channel 18 in one of the first 22 positions for a particular integrator section indicates that a $\Delta x$ increment may be made for the integrator. However, such a pulse does not indicate whether an increment will actually be made and, if so, whether the polarity of such increment will be positive or negative. The actual occurrence of a $\Delta x$ increment for the integrator is indicated by the presence or absence of a coincidental pulse in the channel 22. If a positive pulse is picked up from the channel 22 by the coil 54 at the same time as the pulse representing a possible $\Delta x$ increment for a particular integrator is picked up by the coil 38, a $\Delta x$ increment for the integrator actually occurs. For example, the pulse 162 in FIGURE 11 indicates an actual Δx increment for a particular integrator since it coincides in time with a pulse 164 in the channel 22. A Δx increment is not obtained for the integrator if a pulse does not appear in the channel 22 at the same time as the pulse in the channel 18.

The polarity of each Δx increment is determined by the presence or absence of a coincidental pulse in the channel 24. If a pulse is picked up from the channel 24 by the coil 60 at the same time that pulses indicating an actual Δx increment for a particular integrator are picked up the coils 38 and 54, the Δx increment for the integrator is positive. The Δx increment is negative if a pulse does not appear in the channel 24 at the same time as the pulses in the channels 18 and 22. For example, the pulse 162 in FIGURE 11 indicates a negative Δx increment since a pulse does not appear in the channel 24 simultaneously with the occurrence of the pulses 162 and 164 in the channels 18 and 22, respectively.

The first 22 positions in the channel 16 for each integrator are coded to indicate Δy increments in a manner similar to the coding of corresponding positions in the channel 18 to indicated Δx increments. Since the first 22 positions in each integrator section correspond to the 22 integrators in the digital differential analyzer, each integrator section is coded in particular ones of the first 22 positions in the channel 16 so as to receive the outputs from certain integrators in accordance with the problem to be solved. For example, a pulse would be coded in the channel 16 in a particular one of the first 22 positions for the integrator 158 in FIGURE 12 so as to coincide with the time at which the output from the integrator 152 is made available to the coils 54 and 60 in the channels 22 and 24, respectively. Although only one Δx increment can be obtained for an integrator upon each revolution of the drum, several Δy increments can be obtained. This may be seen by the pulses 168 and 170 in the channel 16 in FIGURE 11.

Each pulse in the first 22 positions in the channel 16 for each integrator represents the possibility of a Δy increment but does not indicate the actual occurrence of such an increment or the polarity of the increment. The actual occurrence of the increment is indicated by the presence or absence of a pulse in the channel 22 at the same time that the pulse in the channel 16 is made available to the coil 32. For example, the pulse 168 in FIGURE 11 indicates an actual Δy increment for a particular integrator since it coincides in time with a pulse 172 in the channel 22. However, no Δy increment is obtained when the pulse 170 is picked up by the coil 32 since there is no coincidental pulse in the channel 22.

The sign of each actual Δy increment is indicated by the presence or absence of a pulse in the channel 24 at the time that pulses in the channels 16 and 22 are simultaneously made available to the coils 32 and 54. For example, the pulse 168 in FIGURE 11 indicates a positive Δy increment for a particular integrator since a pulse 174 appears in the channel 24 at the time that the pulses 168 and 172 are picked up by the coils 32 and 54, respectively.

Since the interrelationship between the different integrators remains constant during the solution of a particular porblem, the coding pulses in the channels 16 and 18 for the first 22 positions of the integrator section must be retained during the computation. Retention of the pulses in the channel 16 is effectuated by the gate circuit 68, which remains open during the first 22 positions in each integrator to pass the coded information in these positions. The gate circuit 68 opens during these pulse positions because of the introduction of a relatively high voltage through the line 70 from the counter 66. The signals then pass through the "or" network 72 for recordation by the coil 36 in the channel 16. Similarly, the gate circuit 74 opens during the first 22 positions for each integrator section so that the coding information can pass through the "or" network 76 for recordation by the coil 42 in the channel 18.

It should be appreciated that the gate circuits similar to the circuit 68 operate to pass information only when positive pulses are simultaneously introduced to all of the input terminals of the circuit. In computer terminology such circuits have been designated as "and" networks. The term "or" networks is also common in computer terminology. Such circuits operate to pass such information when any one of their input terminals receives a relatively high voltage. Such "or" networks are shown in the drawings as triangles and are exemplified by the networks 72 and 76.

During the first 22 positions of each integrator section the gate circuit 78 operates to determine the occurrence of Δy increments for the integrator and the polarity of each such increment. The gate circuit 78 makes such determinations by comparing the pulses from the coil 32 with the pulses from the coils 54 and 60. Each pulse induced in the coil 32 in the first 22 positions of an integrator section indicates that a Δy increment can be obtained. As previously disclosed, the particular position in which a pulse occurs determines for an integrator which of the other integrators in the analyzer provides Δy increments for the integrator. The simultaneous production of a pulse by the coil 54 indicates that a Δy increment has actually occurred. When the coil 60 also produces a simultaneous pulse, the gate circuit 78 indicates that the Δy increment has a positive polarity.

At the same time that the gate circuit 78 operates to determine the occurrence of Δy increments for an integrator and the polarity of each such increment, the counter 80 arithmetically combines each such Δy increment. For example, a signal passing to the counter 80 from the gate circuit 78 may cause the circuit to provide a numerical indication of +4 when an indication of +3 was previously provided by the counter. Similarly, the indications in the counter 80 may change from a value of −3 to a value of −4 upon the introduction of a negative signal from the gate circuit 78.

The counter 80 retains in binary form the numerical information relating to the cumulative value of the Δy increments for an integrator. The counter 80 retains the information in binary form since it comprises a plurality of multivibrators arranged in cascade relationship. In this embodiment, four multivibrators in cascade arrangement are provided. For example, with a resultant count of +5 for the Δy increments for a particular integrator, the first and third multivibrators in the cascade arrangement may be operated to indicate a binary pattern of 0101, where the least significant digit is at the right. In binary form, a pattern of 0101 indicates that $$(0)(2^3)+(1)(2^2)+(0)(2^1)+(1)(2^0)=5$$

Similarly, a value of +3 is indicated by a pattern of 0011, where the least significant digit is at the right.

As previously disclosed, the information controlling increments in the dependent quantity for each integrator is provided in the channel 16 in the first 22 pulse positions for each integrator. The information relating to the dependent quantity y itself occurs in the channels 14, 16, 18 and 20 after the 22nd pulse position for each integrator. As will be disclosed in detail hereinafter, a group of pulse indications simultaneously appearing in the channels 14, 16, 18 and 20 provides an indication as to the value of a decimal digit.

The information relating to the dependent quantity y for each integrator is preceded by a pulse in the channel 16 to indicate that the information which follows relates to the dependent quantity y. For example, a pulse may occur in pulse position 28 for an integrator to indicate that the subsequent information in the channels 14, 16, 18 and 20 relates in part to the dependent quantity y for the integrator. This pulse has been designated in co-pending application Serial No. 217,478 as the "start" pulse.

The "start" pulse in the channel 16 is introduced to the gate circuit 94, which also receives signals through the line 96 from the counter 66. Since a relatively high voltage appears on the line 96 only after the 22nd pulse position for each integrator, the "start" pulse is the first pulse which is able to pass through the gate circuit 94. This pulse passes to the grid of the left tube in the multivibrator 98 and cuts off the tube. The resultant relatively high voltage on the plate of the left tube in the multivibrator 98 is introduced to the gate circuit 104.

Because of its connection to the coil 62, the gate circuit 104 passes each clock signal in the channel 26 after a relatively high voltage is introduced to it from the multivibrator 98. The signals from the gate circuit 104 are introduced directly to the grid of the left tube in the multivibrator 90 and through the "or" network 106 to the grid of the right tube in the multivibrator. The first signal from the gate circuit 104 causes the left tube in the multivibrator 90 to become cut off for reasons which will be disclosed in detail hereafter. Upon the passage of a second signal through the gate circuit 104, the grid of the right tube in the multivibrator 90 becomes cut off and the left tube starts to conduct.

Similarly, the left tube in the multivibrator 90 becomes alternately cut off upon the introduction of odd signals from the gate circuit 104 and the right multivibrator tube becomes cut off upon the introduction of even signals. At the 48th pulse position for each integrator, a signal is introduced from the counter 66 through the line 100 and the "or" network 106 to the grid of the right tube of the multivibrator 90 so as to cut off the tube. In this way, the multivibrator 90 is prepared to have its left tube cut off upon the passage of the first signal through the gate circuit 104 for the next integrator.

As previously disclosed, the plate of the left tube in the multivibrator 90 becomes cut off upon the passage of the first signal through the gate circuit 104. When the left tube in the multivibrator 90 becomes cut off, a relatively high voltage is introduced from the plate of the tube to the gate circuits 82 to open the gate circuits for the introduction of information from the counter 80. It has already been disclosed that the information introduced to the gate circuits from the counter 80 relates to increments in the dependent quality $y$ for each integrator.

The information from the counter 80 passes through the gate circuits 82 to the adder 92 for combination with the signals induced in the coils 27, 32, 38 and 44, respectively. At alternate pulse positions, the signals induced in the coils 27, 32, 38 and 44 relate to the dependent quantity $y$ for the integrator undergoing computation. For example, when the start pulse for an integrator occurs at pulse position 27 for the integrator, pulse position 28 constitutes the first information pulse. Information relating to the value of the dependent quantity $y$ for the integrator is accordingly provided in the channels 14, 16, 18 and 20 in pulse position 28 for the integrator and subsequently in alternate pulse positions such as pulse positions 30, 32, 34, etc.

The information relating to the dependent quantity $y$ for each integrator is provided in the channels 14, 16, 18 and 20 on a decimal basis. For example, when the start pulse occurs in pulse position 27, the information in the channels 14, 16, 18, and 20 for pulse position 28 provides an indication of a decimal number between "0" and "9," inclusive. Similarly, the information in the channels 14, 16, 18 and 20 for pulse position 30 provides an indication of the "tens" digit such as "10," "20," "30," etc. The exact manner in which the signals in the channels 14, 16, 18 and 20 provide such decimal information will be disclosed in detail hereafter.

Since the information in the channels 14, 16, 18 and 20 relate to decimal indications in a particular decimal code and since the signals passing through the gate circuits 82 relate to binary information, the signals passing through the gate circuits 82 are first converted to a decimal basis of the particular code before they are combined with the signals induced in the coils 27, 32, 38 and 44. The correction required to produce this conversion to a decimal base and the circuitry required for such conversion will be described in detail subsequently in connection with the detailed system shown in FIGURES 2 to 7 inclusive. The resultant signals produced by the adder 92 provide an indication in decimal form of the new value of the dependent quantity for the integrator undergoing computation. These signals are introduced to the coils 30, 36, 42 and 48 for recordation in the channels 14, 16, 18 and 20, respectively.

The pulses induced in the coils 27, 32, 38 and 44 are not only introduced to the adder 92 but also to gate circuits 110. Since the gate circuits 110 are also connected to the plate of the left tube in the multivibrator 90, the gate circuits become prepared for opening at alternate pulse positions after the start pulse. In these pulse positions, information relating to the dependent quantity $y$ for each integrator is presented in the channels 14, 16, 18 and 20.

The gate circuits 110 become opened for the passage of information to the adder 92 only when a relatively high voltage is introduced to them from the plate of left tube in the multivibrator 112. Such a high voltage is produced on the plate of the left tube in the multivibrator 112 when a signal passes to the grid of the tube from the gate circuit 114 and since the gate circuit is connected through the line 70 to the counter 66, it becomes prepared for opening only during the first 22 pulse positions of each integrator. During these pulse positions, a signal passes through the gate circuit 114 when pulses of relatively high voltage are simultaneously induced in the coils 38 and 54. The pulse of relatively high voltage induced in the coil 38 indicates the possibility of a $\Delta x$ increment for an integrator undergoing computation. When a pulse simultaneously induced in the coil 54, an indication is provided that a $\Delta x$ increment has actually occurred for the integrator.

Since the signal passing through the gate circuit 114 provides an indication that a $\Delta x$ increment has actually occurred for an integrator, the voltage on the plate of the left tube in the multivibrator 112 becomes relatively high only upon the actual occurrence of such an increment. When the voltage on the plate of the left tube in the mulivibrator 112 becomes high, it remains high during the time that the remaining pulse positions in the integrator are presented for computation. At pulse position 48 for the integrator, a signal is introduced to the grid of the right tube in the multivibrator 112 through the line 100 from the counter 66 so as to cut off the right tube in the multivibrator and make the left tube conductive. In this way, the left tube in the multivibrator 112 is prepared to become triggered into a state of non-conductivity upon the occurrence of a $\Delta x$ increment for the next integrator.

Because of the connection between the plate of the left tube in the multivibrator 112 and the gate circuits 110, information is able to pass through the gate circuits only when a $\Delta x$ increment has actually occurred for an integrator. As previously disclosed, this information relates to the new value of the dependent quantity $y$ for the integrator.

The information in the channels 14, 16, 18 and 20 relating to the value of the dependent quantity $y$ for an integrator is delayed by one pulse position and is then differentially combined in the adder 92 with the signals in the channels 14, 16, 18 and 20 relating to the cumulative value of the differential combination $y\Delta x$ for the integrator. The new information relating to the cumulative value of the differential combination for each integrator is recorded in alternate pulse positions in the channels 14, 16, 18 and 20.

Sometimes, as the $y\Delta x$ increments for an integrator are added to the cumulative value of the differential combination for the integrator, an over-flow is obtained in the information stored in the channels 14, 16, 18 and 20. When an overflow occurs in the cumulative value of the differential combination for an integrator, the indications representing the cumulative value return to an intermediate value so that they can build up again to a relatively high value. At the same time, an over-flow pulse is produced by the adder 92 at pulse position 48 for the integrator. This pulse passes through the gate circuit 120 since the gate circuit opens at the last pulse position for each integrator because of its connection through the line 100 to the counter 66. The pulse then passes through the "or" network 124 for recordation by the coil 52 in the channel 22.

For example, a first pulse of relatively high voltage may be provided in the channel 22 at the 48th position of integrator "1." This pulse indicates that an overflow has occurred in the cumulative $y\Delta x$ value stored in the channel 18 for the integrator but the pulse does not indicate whether the overflow is positive or negative. The pulse is indicated at 180 in the chart shown at FIGURE 13.

In all of the vertical columns in the chart shown in FIGURE 13, except for the two at the extreme right, numbers between "1" and "22" are shown corresponding to the 22 integrators in the digital differential analyzer. In the two columns at the extreme right, numbers are shown prefaced by the letters "I" and "P." The letter "I" followed by a number indicates the particular integrator section, coinciding to a particular integrator that is moving past the coil 52 at any instant. For example, "$I_3$" indicates that a pulse position in the third integrator section is moving past the coil 52 in the channel 22. Similarly, a designation such as "$P_{13}$" indicates that the 13th pulse position in the particular integrator section is moving past the coil 52.

After the pulse 180 is recorded by the coil 52 in the channel 22, it advances from the coil 52 towards the coil 54. During this time, the first 47 positions of integrator section "2" are passing under the coil 52. At the $P_{48}I_2$ section "2" are passing under the coil 52. At the $P_{48}I_2$ position—or, in other words, the last position of integrator section "2"—an indication is recorded by the coil 52 in the channel 22, as indicated at 182 in FIGURE 13. This indication shows whether or not an overflow has occurred in the channel 20 in the cumulative value of the $y\Delta x$ increments for the integrator.

At the $P_1I_3$ position, the indication 180 passes through the gate circuit 128 and the "or" network 124 to the coil 52. The pulse passes through the gate circuit 128 since the gate circuit opens in the first 47 pulse positions of each integrator. After passing through the gate circuit 128 and the "or" network 124, the pulse 180 is again recorded by the coil 52 in the channel 22, this time at the pulse position adjacent to the indication 182.

Similarly, indications are provided in adjacent pulse positions to show whether or not an over-flow has occurred in the cumulative $y\Delta x$ value for each of the other integrators in the analyzer. These indications are recirculated by the gate circuit 128, which remains open during the first 47 pulse positions of each integrator. At the 48th position for each integrator, the gate circuit 128 closes and prevents any recirculation of old information for the integrator.

At the same time that the gate circuit 128 closes, the gate circuit 120 opens. When the gate circuit 120 opens, the overflow information for the integrator section moving past the coil 52 is recorded in the channel 22. In this way, old over-flow information for an integrator is replaced by new over-flow information for the integrator every time that the integrator is presented for computation.

After the indications have been provided in the channel 22 for the 48th pulse position of each integrator, integrator "1" is presented for computation a second time. As the drum 10 rotates through the first 22 positions for the integrator section, the output indications for the 22 integrators move in sequence past the coil 54. This causes the output indications in the channel 22 to become available for determining whether or not a $\Delta x$ increment and $\Delta y$ increments are actually obtained for the integrator during the second computation. The determination of the occurrence of an actual $\Delta x$ increment and of actual $\Delta y$ increments is made by respectively comparing the coding pulses in the channels 16 and 18 with the overflow pulses in the channel 22. The operation of the digital differential analyzer to obtain such a determination has been disclosed previously.

Since the digital differential analyzer operates on a decimal basis, an overflow in the $y\Delta x$ increments would occur only for a value of "10" or a power thereof. For example, the overflow in the cumulative value of the $y\Delta x$ increment for an integrator would occur only for values of 10, 100, 1000, 10,000, etc. In comparison, an overflow could occur for values of 2, 4, 8, 16, 32, 64, 128, etc. in a digital differential analyzer operating on a binary basis, such as in the analyzer disclosed in co-pending application Serial No. 217,478. Since an overflow can occur in the decimal system for a considerable smaller number of values than in the binary system, a certain rigidity in the operation of the digital differential analyzer might result.

This invention provides components for multiplying the cumulative value of the $y\Delta x$ increments for an integrator by such integers as "2" or "5." As a result of such multiplication, an overflow can occur in the cumulative value in the $y\Delta x$ increments for an integrator for such values as 2, 5, 10, 20, 50, 100, 200, 500, 1000, etc. As will be seen, this causes the possibilites of overflow in the decimal system to approach that which can occur in a binary system. In this way, a digital differential analyzer is provided which has the advantage of operating in the decimal system without losing any flexibility which results from operation in the binary system.

Multiplication by either "2" or "5" in the cumulative value of the $y\Delta x$ increments for an integrator is controlled by the inclusion of a positive pulse at the 48th pulse position for the integrator. When multiplication by "2" is to be provided for an integrator a positive pulse is provided in the channel 14 at pulse position 48 for the integrator. Similarly, a positive pulse is provided in the channel 20 for an integrator when the cumulative value of the $y\Delta x$ increments for the integrator is to be multiplied by "5."

When a positive pulse occurs in the channel 14 at pulse position 48 for an integrator, it passes through the gate circuit 134 which opens at this pulse position because of its connection through the line 100 to counter 66. The signal passing through the gate circuit 134 is introduced through the "or" network 108 to the coil 30 for recordation in the channel 14. In this way, the signal is recirculated in the channel 14 in pulse position 48 for the integrator so as to control the operation of the integrator every time that the integrator is presented for computation.

The signal passing through the gate circuit 134 is also introduced to the gate circuit 136 to control the operation of the circuit 136. The circuit 136 in turn passes a signal upon the introduction to it of particular information from the adder 92. The particular information which is required in order for the gate circuit 136 to open will be disclosed in full detail hereafter. Upon the opening of the gate circuit 136, a signal passes through the gate circuit and the "or" network 124 to the coil 52 for recordation by the coil in the channel 22. As previously disclosed, a signal is recorded in channel 22 to indicate that an overflow in the cumulative value of $y\Delta x$ increments has occurred for an integrator.

Because of the operation of the gate circuit 136, a pulse is introduced to the coil 52 for such values as 5, 50, 500, 50,000, etc. Since an overflow would ordinarily occur for the integrator for such values as 10, 100, 1,000, 10,000, etc. the gate circuit 136 in effect operates to multiply the cumulative value of the $y\Delta x$ increments by "2."

In like manner, the gate circuit 138 passes a signal when a pulse occurs in the channel 20 in pulse position 48 for an integrator. This pulse indicates that the cumulative value of the $y\Delta x$ increments is to be multiplied by "5." It is introduced through the "or" network 109 to the coil 48 for recordation in the channel 20 so that it will be available to control the operation of the integrator every time that the integrator is presented for computation.

The output signal from the gate circuit 138 also controls the operation of the gate circuit 139 so that the gate circuit 139 passes a signal for values of 2, 20, 200, 2,000, etc. This signal passes through the "or" network 124 to the coil 52 for recordation in the channel 22 to provide an indication that an overflow has occurred in the cumulative value of the $y\Delta x$ increments. In this way, the gate circuit 139 operates to multiply the cumulative value of the $y\Delta x$ increments for an integrator by "5."

In FIGURE 1, several bistable multivibrators such as the multivibrator 90 are shown. Furthermore, the construction and operation of these multivibrators have been disclosed above on a general basis. A specific circuit for use as such multivibrators is shown in FIGURE 8. The multivibrator includes a pair of tubes 184 and 185. The grid of each tube is connected to an appropriate output stage. For example, if the circuit shown in FIGURE 8 serves as the multivibrator 90 in FIGURE 1, the grid of the tube 184 would be connected to the output terminal of the gate circuit 104 and the grid of the tube 185 would be connected to the output terminal of the "or" network 106. The cathodes of the tubes are connected to the coil 62 and to a suitable source of positive biasing voltages.

Connections are respectively made from the plates of the tubes 184 and 185 through suitable coupling capacitances to the grids of tubes 186 and 187. The cathodes of the tubes 186 and 187 are both connected through a suitable resistance and capacitance to a source of negative voltage. The plate of the tube 186 is coupled to the grid of the tube 187 by a suitable resistance 188 and capacitance 189 connected in parallel. Similarly, the plate of the tube 187 is coupled to the grid of the tube 186 through a resistance 190 and a capacitance 191 connected in parallel.

The plate of the tube 186 is also connected to one terminal of a resistance 192, the other terminal of which is connected to an output line 193. Connections are made from the output line 193 to the cathode of a diode 194 and to the plate of a diode 195. The plate of the diode 194 is biased at approximately −25 v. and the cathode of the diode 195 is biased at approximately 0 v. The plate of the diode 194 and the cathode of the diode 195 also have common terminals with the plate of a diode 196 and the cathode of a diode 197, respectively. The cathode of the diode 196 and the plate of the diode 197 are connected to an output line 198 and to one terminal of a resistance 199 having its other terminal connected to the plate of the tube 187.

Clock pulses are introduced to the cathodes of the tubes 184 and 185 from the coil 62 to reduce the voltages on these tubes from a positive voltage to approximately 0 volt. Upon the simultaneous introduction of a positive pulse to the grid of one of the tubes, the tube conducts. For example, the tube 184 conducts when a positive pulse of voltage is introduced to it from the gate circuit 104. When the tube 184 conducts, the voltage on the plate of the tube falls and causes the tube 186 to become cut off. Since the tube 186 is no longer conductive, the voltage on the plate of this tube rises. This voltage is introduced through the resistance 188 and the capacitance 189 to the grid of the tube 187 to make the tube conductive.

Similarly the tube 187 becomes conductive when a pulse is introduced to the grid of the tube from the "or" network 106 at the same time that a "clock" pulse is introduced to the cathode of the tube from the coil 62. This causes the tube 187 to become cut off and a relatively high voltage to be produced on the plate of the tube.

Upon the production of this high voltage, the tube 186 starts to conduct. In this way, either the tube 186 or the tube 187 conducts at any one time and the other tube is cut off.

The diodes 194, 195, 196 and 197 serve as a clamping network to maintain the voltages on the output lines 193 and 198 at either 0 volt or −25 volts. For example, when a potential of −25 volts is to be produced at the output line 193, current flows through the diode 194 to maintain this potential in case of any tendency of the voltage to become more negative than −25 volts. Similarly, the diode 195 passes a current when a potential of 0 volt is to be produced at the output line 193 and the potential on the line tends to rise above 0 volt.

The system shown in FIGURE 1 and disclosed above is shown in some detail in FIGURES 2 through 7, inclusive. The system includes the channels 14, 16, 18, 20, 22, 24 and 26 and the coils respectively associated with the different channels. For example, the coils 27, 28 and 30 are associated with the channel 14. The coil 27 is connected to the grid of the left tube in a bistable multivibrator 202 (FIGURE 2) and to the input terminal of an inverter 204, the output from which is introduced to the grid of the right tube in the multivibrator 202. In like manner, a multivibrator 206 and an inverter 208; a multivibrator 210 and an inverter 212; a multivibrator 214 and an inverter 216; a multivibrator 218 and an inverter 220; and a multivibrator 222 and an inverter 224 are respectively associated with the coils 32, 38, 44, 54 and 60.

Connections are made from the plates of the left and right tubes in the multivibrator 206 to input terminals of gate circuits 228 and 230, respectively. Other input terminals of the gate circuits 228 and 230 are connected through a line 232 to a counter 234 corresponding to the counter 66 shown in FIGURE 1. Similarly, the voltages on the plates of the left and right tubes in the multivibrator 210 are respectively introduced to input terminals of gate circuits 236 and 238 having other input terminals connected through the line 232 to the counter 234.

The output signals from the gate circuits 228 and 230 respectively pass through "or" networks 240 and 242 to the grids of the left and right tubes in a bistable multivibrator 244. The voltage on the plate of the left tube in the multivibrator 244 is in turn introduced through an "or" network 245 to the coil 36 for recordation in the channel 16. In like manner, the signals from the gate circuits 236 and 238 respectively pass through "or" networks 246 and 248 to the grids of the left and right tubes in a bistable multivibrator 250. A connection is made from the plate of the left tube in the multivibrator 250 to the coil 42 for the recordation of information in the channel 18.

The voltage on the plate of the left tube in the multivibrator 206 is not only introduced to the gate circuit 228 but also to a gate circuit 254 having other input terminals connected to the line 232 and to the plate of the left tube in the multivibrator 218. The output signals from the gate circuit 254 pass to input terminals of gate circuits 256 and 258, other input terminals of which are respectively connected to the plates of the left and right tubes in the multivibrator 222. The output terminals of the gate circuit 256 and 258 are connected to a $\Delta y$ summing counter 260 corresponding to the counter 80 shown in FIGURE 1.

Figure 2:
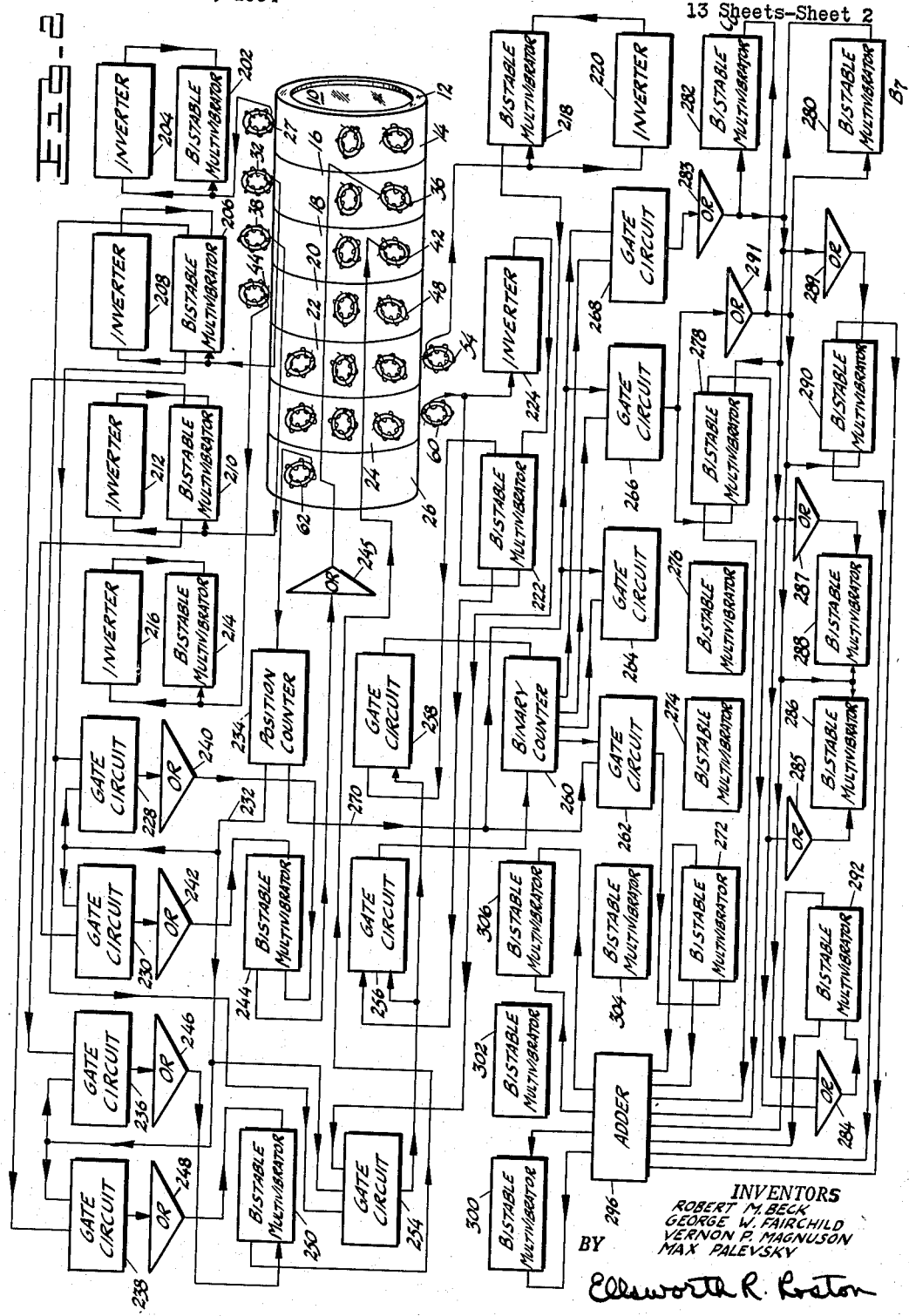

The output terminals of the $\Delta y$ counter 260 are connected to input terminals of gate circuits such as circuits 262, 264, 266 and 268 having other input terminals connected through a line 270 to the counter 234. Only certain of the gate circuits are shown in FIGURE 2 for purposes of simplicity. The output terminals of the gate circuits such as the circuits 262, 264, 266 and 268 are in turn connected to the grids of the left and right tubes in bistable multivibrators 272, 274, 276 and 278, respectively.

In addition to being connected to the grid of the left tube in the multivibrator 278, the output terminal of the gate circuit 266 is also connected through an "or" network 291 to the grid of the left tube in a bistable multivibrator 280 and to the grid of the right tube in a bistable multivibrator 282. Similarly, the output from the gate circuit 268 is introduced through an "or" network 283 to the grid of the right tube in the multivibrator 280 and the grid of the left tube in the multivibrator 282.

Connections are made from the output terminal of the gate circuit 268 through the "or" network 283 to an "or" network 284, through an "or" network 285 to the grid of the left tube in a bistable multivibrator 286 and through "or" networks 291 and 289 to the grids of the right tubes in bistable multivibrators 288 and 290. The output terminal in the gate circuit 266 is connected through the "or" network 279 to the "or" network 284, to the grid of the right tube in the multivibrator 286 and to the grids of the left tubes in the multivibrators 288 and 290. The signals passing through the "or" network 284 are introduced to the grid of the left tube in a bistable multivibrator 292.

The plates of the two tubes in each of the multivibrators 292, 286, 288 and 290 are connected to an adder 296. Only certain of these connections are shown for purposes of convenience. The adder 296 also receives the signals from the plates of the two tubes in the multivibrators 272, 274, 276 and 278 and arithmetically combines this information with the signals from the multivibrators 292, 286, 288 and 290. The results obtained are introduced to the appropriate grids of the two tubes in each of bistable multivibrators 300, 302, 304 and 306. Only certain of the connections to the multivibrators 300, 302, 304 and 306 are shown for purposes of convenience.

Figure 3:
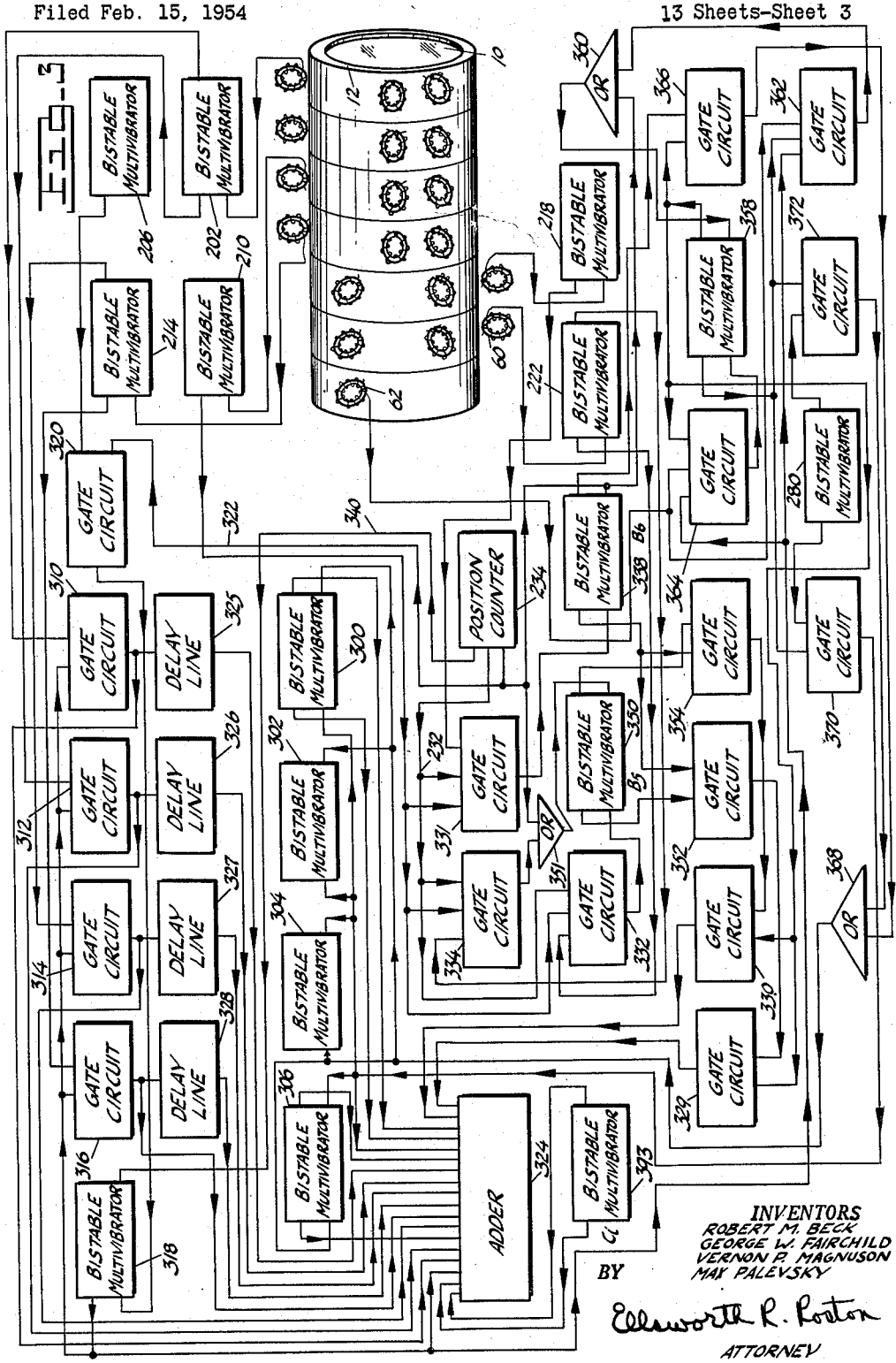

As shown in FIGURE 3, the voltages on the plates of both tubes in the multivibrators 202, 206, 210 and 214 are connected to input terminals of gate circuits such as gate circuits 310, 312, 314 and 316. For purposes of simplicity, only the gate circuits 310, 312, 314 and 316 are shown in FIGURE 3. Other terminals of the gate circuits such as the circuits 310, 312, 314 and 316 are connected to the plate of the left tube in a start multivibrator 318 corresponding to the multivibrator 98 shown in FIGURE 1. The grid of the left tube in the multivibrator 318 receives its voltage from the output terminal of a gate circuit 320 corresponding to the gate circuit 94 shown in FIGURE 1. Input terminals of the gate circuit 320 are connected to the plate of the left tube in the multivibrator 206 and through a line 322 to the counter 234.

The output signals from the gate circuits such as the gate circuits 310, 312, 314 and 316 are introduced to delay lines such as the delay lines 325, 326, 327 and 328 for a delay of one pulse position. These delay lines may be bistable multivibrators similar to those disclosed above. The output signals from the gate circuits such as the circuits 310, 312, 314 and 316 and from the delay lines such as the lines 325, 326, 327 and 328 are introduced to an adder 324. The operation of the adder 324 is controlled by the voltage on the plate of the left tube in the multivibrator 318 and by signals passing through gate circuits 329 and 330.

In addition to being connected to one of the gate circuits corresponding to the circuits 310, 312, 314 and 316, the plate of the left tube in the multivibrator 210 is connected to input terminals of gate circuits 331, 332 and 334. Connections are made to other input terminals of the gate circuit 331 from the plate of the left tube in the multivibrator 218 and through the line 232 from the counter 234. The signals passing through the gate circuit 331 are applied to the grid of the left tube in a multivibrator 338, the grid of the right tube in the multivibrator being connected through a line 340 to the counter 234.

Like the gate circuit 331, the gate circuits 332 and 334 receive voltages through the line 232 from the counter 234. Voltages are also respectively applied to input terminals of the gate circuits 332 and 334 from the plates of the left and right tubes in the multivibrator 222. The output signals from the gate circuit 332 pass to the grid of the left tube in a bistable multivibrator 350, and the output signals from the gate circuit 334 pass through an "or" network 351 to the grid of the right tube in the multivibrator. Signals from the counter 234 also pass through the line 340 and the "or" network 351 to the grid of the right tube in the multivibrator 350. The voltages on the plates of the left and right tubes in the multivibrator 350 are in turn respectively applied to gate circuits 352 and 354 having other input terminals connected to the plate of the left tube in the multivibrator 338.

The output signals from the gate circuits 352 and 354 are respectively connected to input terminals of the gate circuits 329 and 330, other input terminals of which are connected to the plate of the right tube in a multivibrator 358. The grid of the right tube in the multivibrator 358 is connected to an output terminal of an "or" network 360, input terminals of which are connected to a gate circuit 362 and through the line 340 to the counter 234. Connections are made to input terminals of the gate circuit 362 from the coil 62 in the channel 26 and from the plates of the left tubes in the multivibrators 318 and 358.

The voltage on the plate of the right tube in the multivibrator 358 is also applied to an input terminal of a gate circuit 364. Other input terminals of the gate circuit 364 are connected to the coil 62 and to the plate of the left tube in the multivibrator 318, and the output terminal is connected to the grid of the left tube in the multivibrator 358.

In addition, the voltage on the plate of the right tube in the multivibrator 358 is applied to an input terminal of a gate circuit 366, another input terminal of which is connected to the plate of the right tube in the multivibrator 338. The signals passing through the gate circuit 366 are introduced to an "or" network 368 having its output terminal connected to the grids of the left tubes in the multivibrators 300 and 302 and to the grids of the right tubes in the multivibrators 304 and 306.

Connections are made from the plate of the left tube in the multivibrator 358 to input terminals of gate circuits 370 and 372. The gate circuit 370 has a second input terminal connected to the plate of the left tube in the multivibrator 280 and the gate circuit 372 has a second input terminal connected to the plate of the right tube in the multivibrator. The output from the gate circuit 372 is applied to the "or" network 368, and the output from the gate circuit 370 is introduced to the grids of the right tubes in the multivibrators 300 and 302 and to the grids of the left tubes in the multivibrators 304 and 306.

Figure 4:
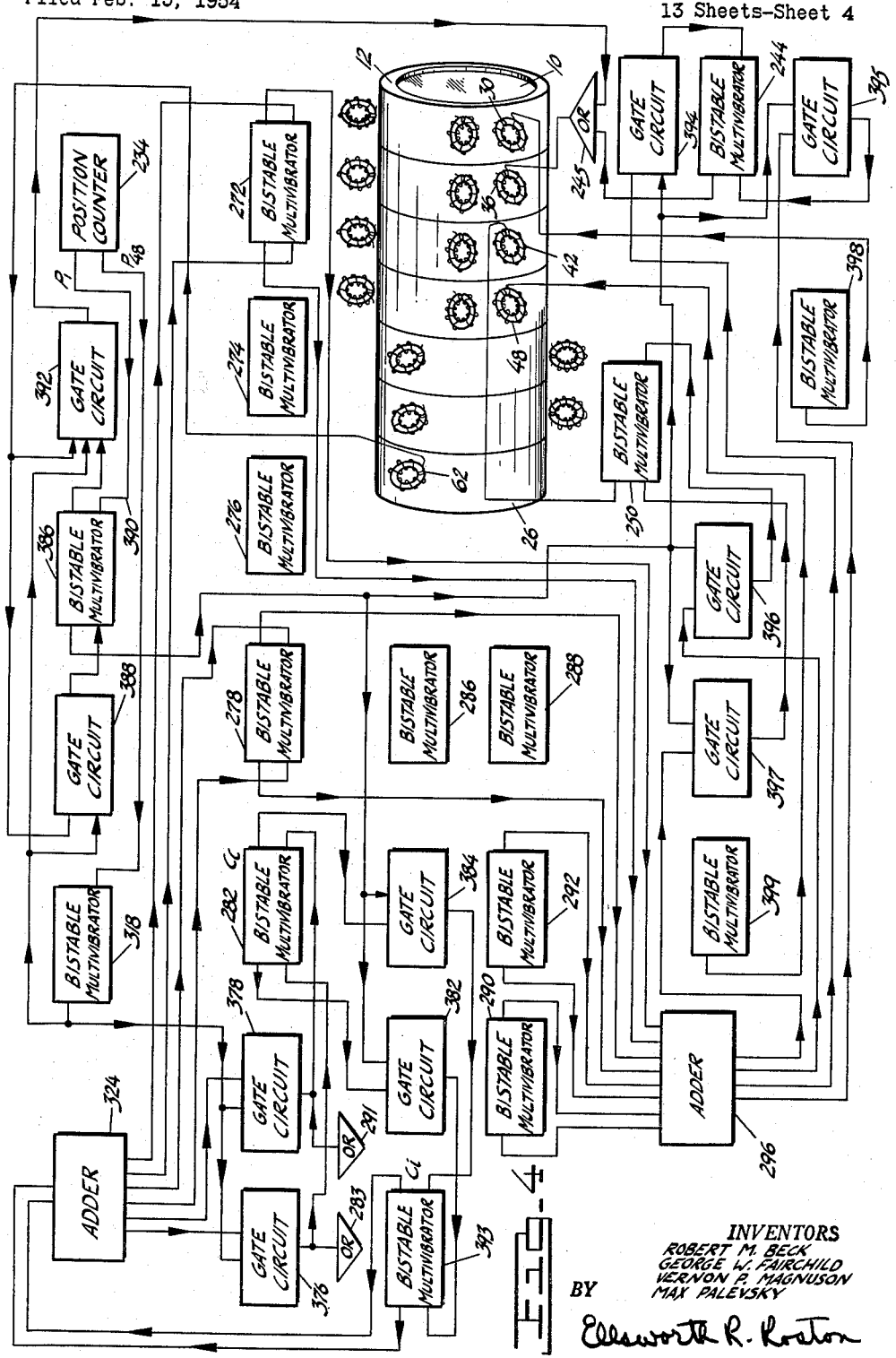

The output from the adder 324 shown in FIGURE 3 is applied to the grids of both tubes in each of the multivibrators 272, 274, 276, and 278 shown in FIGURES 2 and 4. Only certain of these connections are shown for purposes of convenience. The output from the adder 324 is also applied to gate circuits 376 (FIGURE 4) and 378 having other input terminals connected to the plate of the left tube in the multivibrator 318. The output signals from the gate circuits 376 and 378 are in turn respectively introduced to the "or" networks 283 and 279 also shown in FIGURE 2. As previously disclosed, the signals passing through the "or" network 283 and 279 control the operation of the multivibrators 292, 286, 288 and 290.

The output signals passing through the gate circuits 376 and 378 are also respectively introduced to the grids of the left and right tubes in the bistable multivibrator 282 also shown in FIGURE 2. Connections are respectively made from the plates of the left and right tubes in the multivibrator 282 to input terminals of gate circuits 382 and 384, each of which has another input terminal connected to the plate of the left tube in a multivibrator 386.

The grid of the left tube in the multivibrator 386 receives signals from an output terminal of a gate circuit 388 having input terminals connected to the coil 62 in the channel 26 and to the plate of the left tube in the multivibrator 318. The grid of the right tube in the multivibrator 386 has a voltage introduced to it through a line 390 from the counter 234, and the plate of the right tube in the multivibrator has its voltage applied to a gate circuit 392. Other input terminals of the gate circuit 392 are connected to the coil 62 and to the plate of the left tube in the multivibrator 318. The output from the gate circuit 392 passes to the coil 36 through the "or" network 245 also shown in FIGURE 2.

The output signals from the gate circuits 382 and 384 are respectively introduced to the grids of the left and right tubes in a multivibrator 393. As shown in FIGURES 3 and 4, the voltages on the plates of the left and right tubes in the multivibrator 393 are introduced to the adder 324 for combination with the signals from the multivibrators 300, 302, 304 and 306 and the signals from the gate circuits corresponding to the circuits 312, 314, 316 and 318. As will be disclosed in detail hereinafter, the voltages on the plates of the two tubes in the multivibrator 393 control the carry to one pulse position of the results obtained by the addition in the adder 324 of information provided for a previous pulse position.

As shown in FIGURE 2 and disclosed previously, the output from the multivibrators 272, 274, 276 and 278 is combined in the adder 296 with the output from the multivibrators 292, 286, 288 and 290. The particular pattern of voltages introduced to the adder 296 from the multivibrators 292, 286, 288 and 290 is controlled by the voltages from the gate circuits 266 and 268. The connections to obtain the particular patterns of voltages in the multivibrators 292, 286, 288 and 290 for a high voltage on the output terminals of either the gate circuit 266 or the gate circuit 268 are shown in FIGURE 2 and have been disclosed previously.

The output signals from the adder 296 are applied to gate circuits such as the circuits 394, 395, 396 and 397 in FIGURE 4. Other input terminals of the gate circuits corresponding to the circuits 394, 395, 396 and 397 are connected to the plate of the left tube in the multivibrator 386, and the output terminals of the gate circuits are connected to the grid of one of the tubes in the multivibrators 244 and 250 and in multivibrators 398 and 399.

Figure 5:
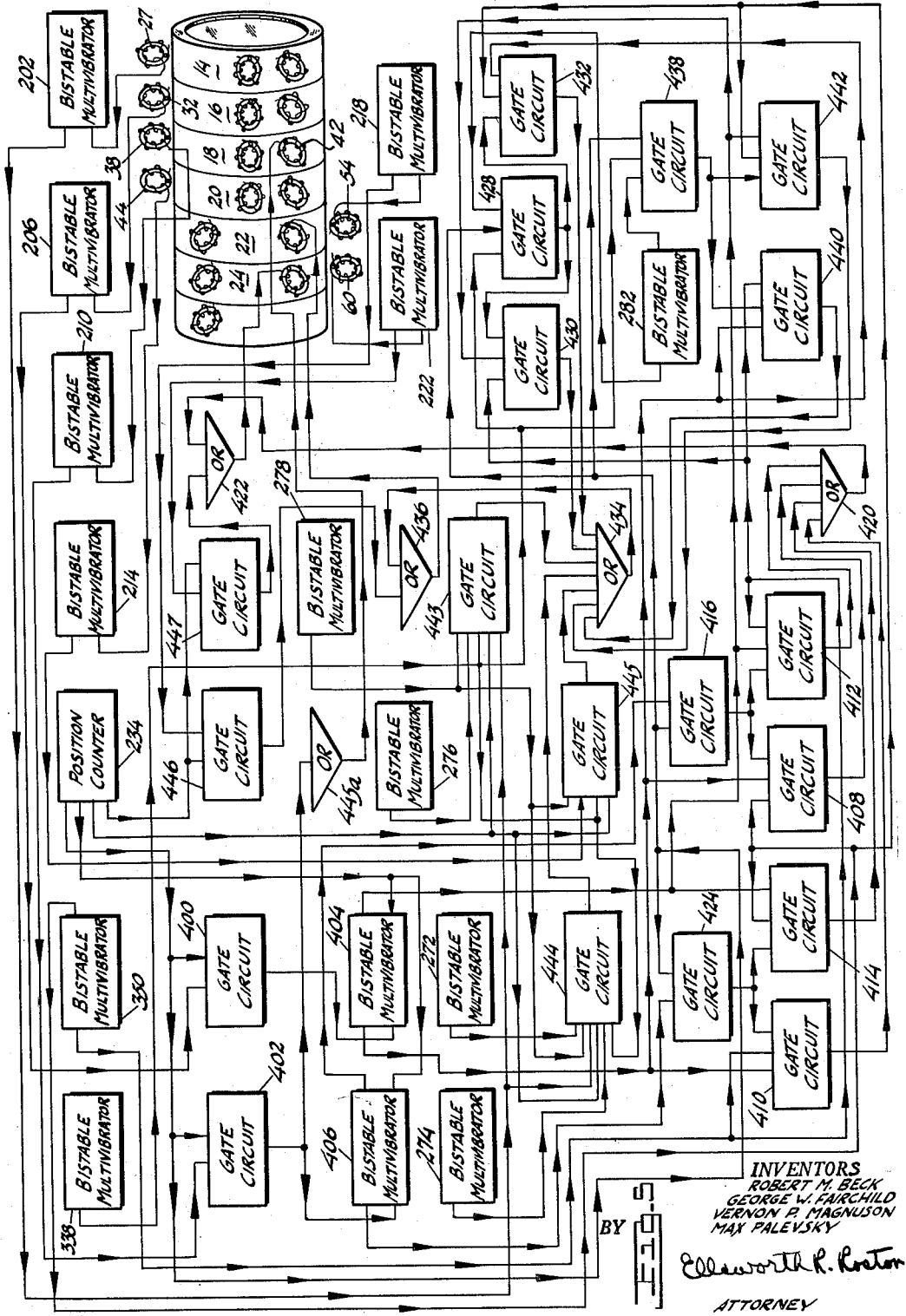

As shown in FIGURE 5, the voltages on the plates of the left tubes in the multivibrators 206 and 210 are respectively introduced to input terminals of gate circuits 400 and 402. The gate circuits 400 and 402 also receive signals through the line 340 from the counter 234 and introduce their output signals to the grids of the left tubes in bistable multivibrators 404 and 406. The grids of the right tubes in the multivibrators 404 and 406 are connected through the line 390 to the counter 234.

Connections are made from the plate of the left tube in the multivibrator 404 to input terminals of gate circuits 408 and 410 and from the plate of the right tube in the multivibrator 404 to input terminals of gate circuits 412 and 414. The gate circuits 408 and 412 also receive the output signals from a gate circuit 416 having its input terminals connected to the plate of the right tube in the multivibrator 406 and through the line 340 to the counter 234. Other input terminals of the gate circuits 408 and 412 are respectively connected to the plates of the right and left tubes in the multivibrator 350, which is also shown in FIGURE 3. The output signals from the gate circuits 408 and 412 pass through "or" networks 420 and 422 to the coil 58 for recordation in the channel 24.

Other input terminals of the gate circuits 410 and 414 have voltages applied to them from a gate circuit 424, which in turn has input terminals connected to the plate of the left tube in the multivibrator 406 and through the line 340 to the counter 234. The gate circuits 410 and 414 also have input terminals respectively connected to the plates of the left and right tubes in the multivibrator 350. The output signals from the gate circuits 410 and 414 pass through the "or" networks 420 and 422 to the coil 58 for recordation in the channel 24.

Connections are made to a gate circuit 428 from the plates of the left tubes in the multivibrators 282 and 338 and through the line 340 from the counter 234. The output signals from the gate circuit 428 are applied to input terminals of gate circuits 430 and 432. Other input terminals of the gate circuit 430 are connected to the plate of the left tube in the multivibrator 350 and to the plate of the right tube in the multivibrator 404. In like manner, other input terminals of the gate circuit 432 are connected to the plate of the right tube in the multivibrator 350 and the plate of the left tube in the multivibrator 404. The output signals from the gate circuits 430 and 432 pass through "or" networks 434 and 436 to the coil 52 for recordation in the channel 22.

Signals are applied to a gate circuit 438 from the plate of the left tube in the multivibrator 338, from the plate of the right tube in the multivibrator 282 and through the line 340 from the counter 234. The output signals from the gate circuit 438 pass to input terminals of gate circuits 440 and 442. Other input terminals of the gate circuit 440 are connected to the plates of the left tubes in the multivibrators 350 and 404. Connections are also made to other input terminals of the gate circuit 442 from the plates of the right tube in the multivibrators 350 and 404. The output signal from the gate circuits 440 and 442 pass through the "or" networks 434 and 436 to the coil 52 for recordation in the channel 22.

The "or" network 434 also receives the output signals from gate circuits 443, 444 and 445. Connections are made to input terminals of the gate circuit 443 from the plates of the left tubes in the multivibrators 202, 276, 278 and 338 and through the line 340 from the counter 234. Voltages are applied to input terminals of the gate circuit 444 from the left tubes in the multivibrators 202, 272, 274, 278 and 338 and from the counter 234. The gate circuit 445 receives voltages from the plates of the left tubes in the multivibrators 214, 278 and 338 and through the line 340 from the counter 234.

The signals from a pair of gate circuits 446 and 447 also pass through the "or" networks 436 and 422 for recordation by the coils 52 and 58 in the channels 22 and 24, respectively. Input terminals of the gate circuit 446 are connected to the plate of the left tube in the multivibrator 218 and through a line 448 to the counter 234. Similarly, connections are made to input terminals of the gate circuit 447 from the plate of the left tube in the multivibrator 222 and through the line 448 from the counter 234.

Figure 6:
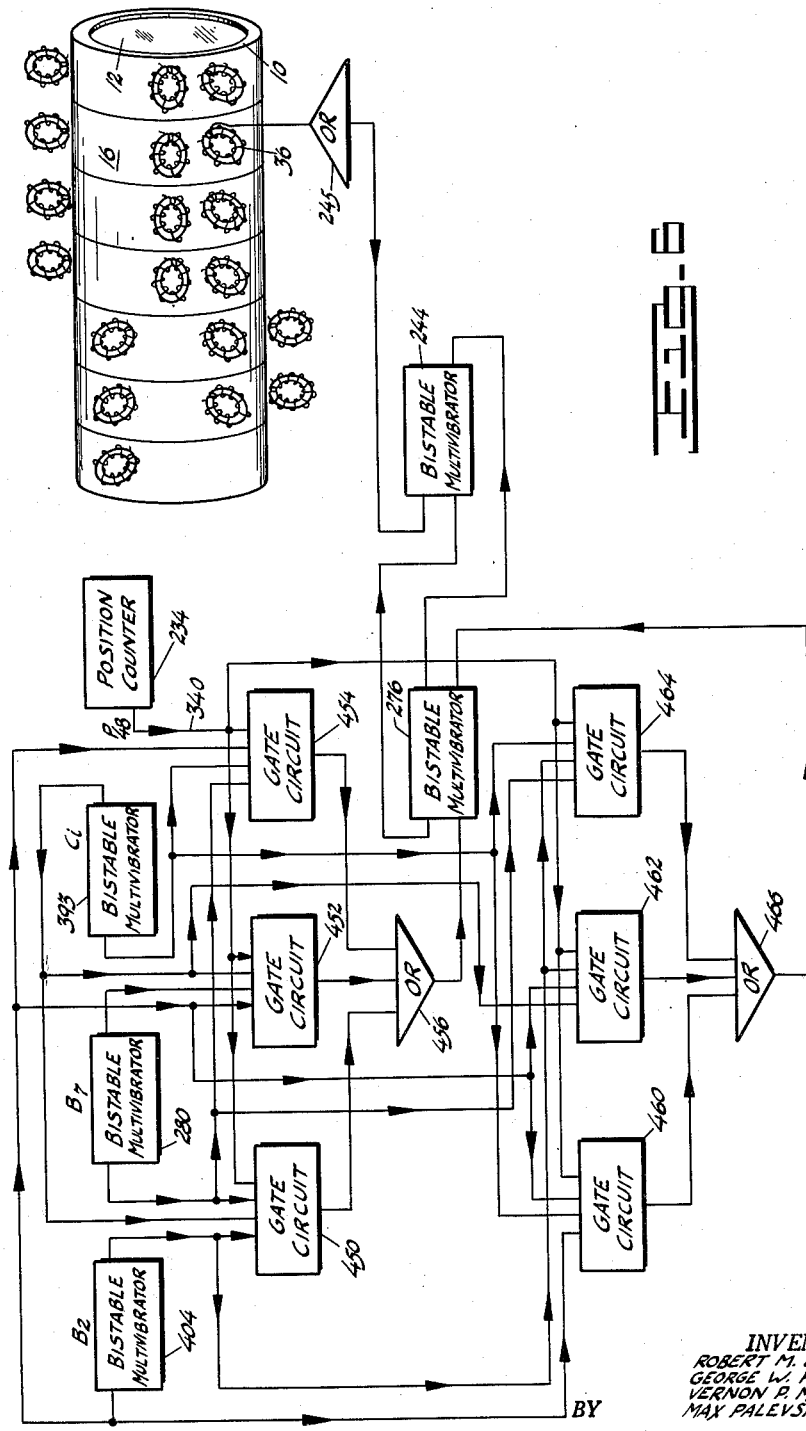

In FIGURE 6, a plurality of gate circuits 450, 452 and 454 are connected in various arrangements to the multivibrators 280, 393 and 404. Connections are made to input terminals of the gate circuit 450 from the plate of the left tube in the multivibrator 280, from the plates of the right tubes in the multivibrators 393 and 404 and through the line 340 from the counter 234. Voltages are applied to input terminals of the gate circuit 452 from the line 340, the plate of the left tube in the multivibrator 404 and the plates of the right tubes in the multivibrators 280 and 393. Similarly, signals pass to input terminals of the gate circuit 454 from the line 340 and the plates of the left tubes in the multivibrators 280, 393 and 404. The output signals from the gate circuits 450, 452 and 454 pass through an "or" network 456 to the grid of the left tube in the multivibrator 276, which is also shown in FIGURE 2.

Signals from the multivibrators 280, 393 and 404 are also applied to gate circuits 460, 462 and 464 in particular arrangements. The gate circuit 460 receives signals from the plates of the left tubes in the multivibrators 393 and 404, from the plate of the right tube in the multivibrator 280 and through the line 340 from the counter 234. Voltages are applied to input terminals of the gate circuit 462 from the line 340 and the plates of the right tubes in the multivibrators 280, 393 and 404. Connections are made to input terminals of the gate circuit 464 from the line 340, from the plates of the left tubes in the multivibrators 280 and 393 and from the plate of the right tube in the multivibrator 404. The output signals from the gate circuits 460, 462 and 464 pass through an "or" network 466 to the grid of the right tube in the multivibrator 276.

Figure 7:
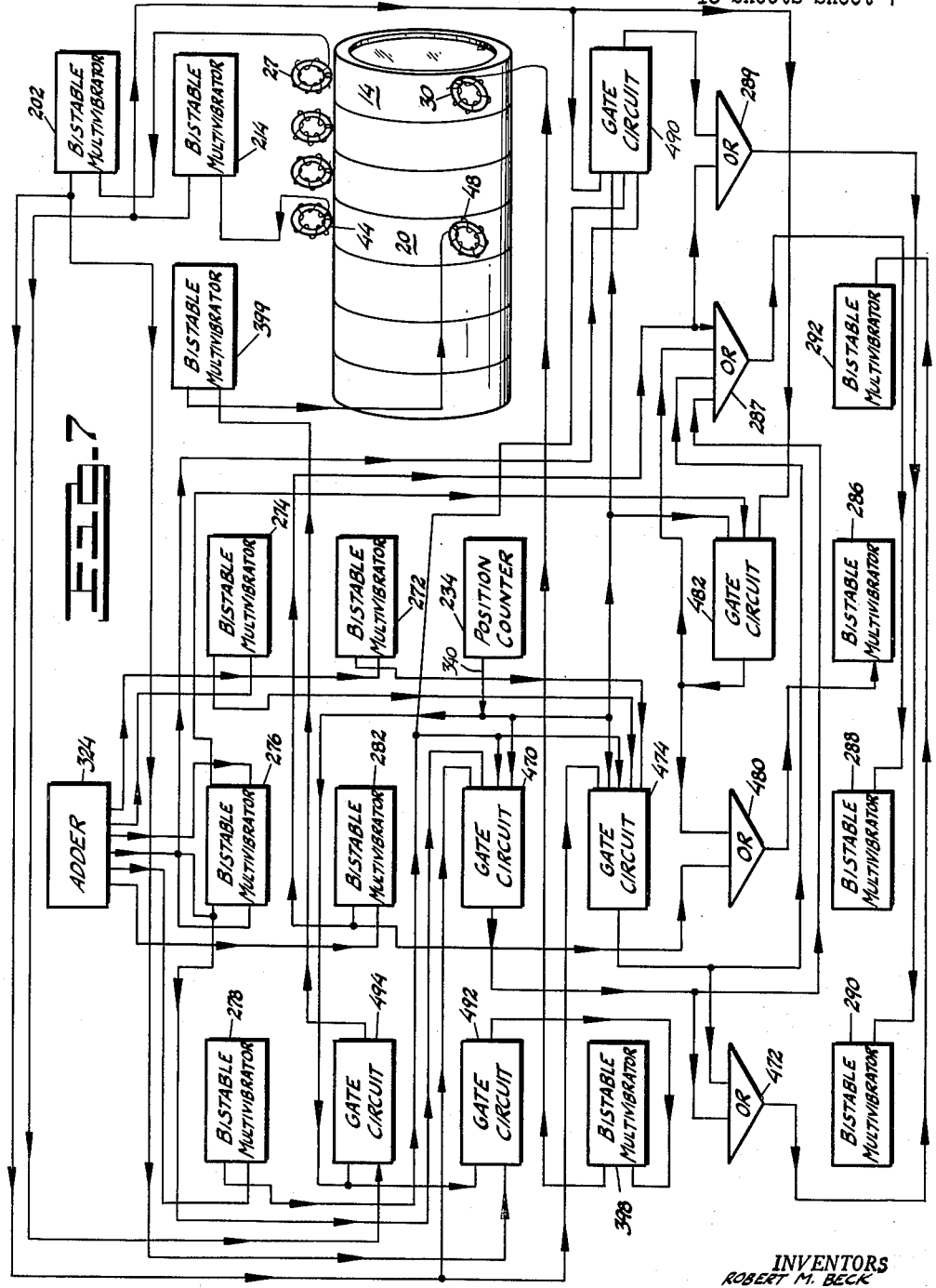

In FIGURE 7, a circuit diagram is shown for controlling the operation of the digital differential analyzer to produce a multiplication by such integers as "2" or "5." The circuit includes a gate circuit 470 which has input terminals connected to the plates of the left tubes in the multivibrators 202, 276 (also shown in FIGURES 2 and 4) and 278 and through the line 340 to the counter 234. The output from the gate circuit 470 passes through an "or" network 472 to the grid of the right tube in the multivibrator 292. The "or" network 472 also receives signals from a gate circuit 474. Input terminals of the gate circuit 474 are connected to the plates of the left tubes in the multivibrators 202, 272, 274 and 278 and through the line 340 to the counter 234.

A signal passes from a gate circuit 482 through the "or" network 480 to the grid of the left tube in the multivibrator 286. Connections are made to input terminals of the gate circuit 482 from the plate of the left tube in the multivibrator 214, from the plate of the right tube in the multivibrator 276 from the counter 234 and from the adder 324.

The grid of the right tube in the multivibrator 288 has a voltage applied to it from the "or" network 287. The "or" network in turn has input terminals connected to the plate of the left tube in the multivibrator 282, the output terminals of the gate circuits 470, 474 and 482. Similarly, the grid of the right tube in the multivibrator 290 receives signals from the "or" network 289, which receives input voltages from the plate of the left tube in the multivibrator 282 and from a gate circuit 490. Input terminals of the gate circuit 490 are connected to the plates of the left tubes in the multivibrators 214, 276 and 278 and from the counter 234.

A gate circuit 492 has input terminals connected to the plate of the left tube in the multivibrator 202 and to the counter 234. The output from the gate circuit 492 is applied to the grid of the left tube in the multivibrator 398, the plate of which is connected to the coil 30, as also shown in FIGURE 4. Similarly, connections are made to input terminals of a gate circuit 494 (FIGURE 7) from the plate of the left tube in the multivibrator 214 and from the counter 234. The signals passing through the gate circuit 494 are introduced to the grid of the left tube in the multivibrator 399, the plate of the left tube being connected to the coil 48 as also shown in FIGURE 4.

As previously disclosed, a pulse is provided in the channel 18 in one of the first 22 positions for each integrator to control the occurrence of a Δx increment for the integrator every time that the integrator is presented for computation. The particular position in which the coding pulse is recorded for the integrator undergoing computation is dependent upon which of the other integrators feeds Δx increments into the integrator undergoing computation. Since the connections between integrators remains constant during the solution of a problem, the coding pulse in the channel 18 in one of the first 22 positions for each integrator remains constant during the solution of the problem. As a result, these pulses have to be retained during the solution of a problem.

Retention of the pulses in the channel 18 is provided by the multivibrator 210 (FIGURE 2), the gate circuits 236 and 238 and stages associated with these gate circuits. The pulses in the channel 18 having a first polarity of magnetization are converted by the coil 38 to pulses of relatively high voltage. These voltage pulses are then introduced to the grid of the left tube in the multivibrator 210 so as to cut off the tube. When the left tube in the multivibrator 210 becomes cut off, a high voltage is produced on the plate of the tube and is introduced to the gate circuit 236.

The gate circuit 236 is opened by a signal from the counter 234 when the first pulse in each integrator is picked up by the coil 62. The gate circuit 236 remains open so that information in the channel 18 up to and including the 22nd pulse position for each integrator can pass through the gate circuit. During the time that the gate circuit 236 remains open, the positive pulses from the plate of the left tube in the multivibrator 210 pass through the gate circuit to the "or" network 246. The network 246 in turn passes to the grid of the left tube in the multivibrator 250 any positive pulses introduced to it. These signals cause the left tube in the multivibrator 250 to become cut off and a positive pulse of voltage to be produced on the plate. The positive voltage pulse passes to the coil 42 for recordation in the channel 18. In this way, the coil 42 operates to produce a magnetic field in the channel 18 similar to the pattern of the electrical signals induced in the coil 38.

In like manner, a pulse of low voltage is induced in the coil 38 to indicate the integer "0" for a pulse position. This voltage pulse is inverted by the inverter 212 and introduced as a positive pulse to the grid of the right tube in the multivibrator 210 to cut off the tube and to produce a positive pulse on the plate of the tube. When such a pulse is produced in one of the first 22 positions for an integrator, the gate circuit 238 opens and the pulse passes through the gate circuit and the "or" network 248 to the grid of the right tube in the multivibrator 250. Since the right tube in the multivibrator becomes cut off upon the introduction of such a pulse, the left tube becomes conductive. This causes a pulse of low voltage to pass to the coil 42 for recordation in the channel 18.

Similarly, the multivibrator 206, the gate circuit 228, the "or" network 240 and the multivibrator 244 in FIGURE 2 operate to recirculate in the channel 16 the positive coding information provided in the first 22 positions of each integrator. As previously disclosed, positive pulses may be provided in the channel 16 in the first 22 positions for each integrator to indicate whether any variations in the value of the dependent quantity $y$ will be made for the integrator.

The gate circuit 254 operates to determine whether or not an actual Δy increment is made for an integrator at the time that a coding pulse appears in the channel 16 in one of the first 22 positions for the integrator. The gate circuit 254 receives the coding pulses in the channel 16 because of its connection to the plate of the left tube in the multivibrator 206. The connection from the counter 234 through the line 232 to the gate circuit 254 causes the gate circuit to become open during the first 22 positions of each integrator. The operation of the counter 234 to provide a relatively high voltage during the first 22 positions of each integrator is fully disclosed in co-pending application Serial No. 217,478, filed March 26, 1951, by Steele and Collison.

Since the gate circuit 254 is also connected to the plate of the left tube in the multivibrator 218, it can open for the passage of a signal only when high voltages are simultaneously produced on the plates of the left tubes in the multivibrators 206 and 218. A relatively high voltage is produced on the plate of the left tube in the multivibrator 218 only when a relatively high voltage is induced in the coil 54. As previously disclosed, the coil 54 indicates in adjacent pulse positions any overflow in the value of the cumulative yΔx increments which are obtained for each of the 22 integrators in the analyzer.

The passage of a pulse through the gate circuit 254 indicates only the occurrence of a Δy increment for an integrator, but it does not indicate whether such increment is positive or negative. The polarity of each pulse passing through the gate circuit 254 is indicated by the gate circuits 256 and 258, both of which receive the signals from the gate circuit 254. Since the gate circuit 256 is connected to the plate of the left tube in the multivibrator 222, it receives a relatively high voltage when a relatively high voltage is induced in the coil 60. As previously disclosed, a high voltage from the coil 60 indicates a positive increment. Since the gate circuit 256 passes a signal only when relatively high voltages are simultaneously introduced to it from the gate circuit 254 and from the plate of the left tube in the multivibrator 222, the gate circuit 256 passes a signal only when a Δy increment of positive polarity has occurred.

Each signal passing through the gate circuit 256 for an integrator causes the numerical indications provided by the counter 260 to increase by an integer is a positive direction. For example, a signal passing to the counter 260 from the gate circuit 256 may cause the counter to provide a numerical indication of +3 when an indication of +2 was previously provided by the counter. Similarly, the indications in the counter 260 may change from −3 to −2 upon the introduction of a signal from the gate circuit 256.

As previously disclosed, a positive increment in the cumulative yΔx value for an integrator is indicated by the simultaneous occurrence of pulses in the channels 22 and 24. Similarly, a negative increment in the cumulative yΔx value for the integrator is indicated by the absence of a pulse in the channel 24 at the time that a pulse is produced in the channel 22. Because of the absence of a pulse in the channel 24, a relatively low voltage is induced in the coil 60. This voltage is inverted by the inverter 224 and is introduced as a relatively high voltage to the grid of the right tube in the multivibrator 222. The high voltage introduced to the grid of the right tube in the multivibrator 222 causes the tube to become cut off and a high voltage to be produced on the plate of the tube.

When a high voltage is produced on the plate of the right tube in the multivibrator 222 at the same time that a positive pulse passes through the gate circuit 254, the gate circuit 258 opens and passes a signal to the counter 260. This signal provides an indication of a negative Δy increment. Since the counter 260 is adapted to provide a negative count as well as a positive count of the Δy increments, it operates upon the introduction of signals from the gate circuit 260 to subtract an integer from the resultant value of the counter. For example, the indications in the counter 260 are changed from +4 to +3 when a signal is introduced to the counter from the gate circuit 258. The operation of the counter 260 in providing a positive and negative count of digital increments is fully disclosed in co-pending application Serial No. 217,478.

As previously disclosed, the counter 260 is formed from a plurality of multivibrators arranged in cascade arrangement. Specifically, four multivibrators are disclosed in co-pending application Serial No. 217,478. The operation of these multivibrators for a positive or a negative count is controlled by a plurality of gate circuits operative in accordance with logical equations disclosed in the specification and in FIGURE 29 of the co-pending application.

The information in the counter 260 is introduced to the gate circuits such as the circuits 262, 264, 266 and 268 such that each of the gate circuits receives information relating to a binary digit of increasing significance. Because of their connection through the line 270 to the counter 234, the gate circuits such as the circuits 262, 264, 266 and 268 open at pulse position 23 of each integer to pass to the multivibrators 272, 274, 276 and 278 the information relating to the cumulative value of the Δy increments for each integrator.

The information passing to the multivibrators 272, 274, 276 and 278 from the gate circuits such as the circuits 262, 264, 266 and 268 causes the multivibrators to be triggered in a pattern dependent upon the indications in the counter 260. This causes a corresponding pattern of voltages to be produced on the plates of the multivibrator tubes for introduction to the adder 296. Since the indications provided by the multivibrators 272, 274, 276 and 278 relate to a binary number and since the digital differential analyzer constituting this invention operates on a decimal basis, the adder 296 performs the addition which converts the information from the multivibrators into a binary-code-decimal form.

The digital differential analyzer constituting this information operates in particular decimal code known as the "excess three" code. In this code, the value "0" is indicated in binary form by 0011 for successive pulse positions, where the least significant digit is at the right. Since an indication of 0011 would ordinarily constitute an indication of the integer "3," the "excess three" code constitutes the normal binary code with a value of +3 added when the number is positive. This may be seen by a comparison of the charts shown in FIGURES 14 and 15, which respectively indicate the "excess three" code and the normal binary code.

As will be seen in the chart shown in FIGURE 14, an indication of "0" for a count in a negative integer is indicated by 1101 where the least significant digit is at the right. This is obtained by inverting the indications of 0011 representing the value of "0" for a positive count so as to obtain a value of 1100 and by adding the binary indication "1" to the least significant digit. The inversion of the indications representing a positive digit and the addition of the indication "1" to the least significant digit of the inverted number constitutes the standard way of indicating a negative number in binary form. Since each of the positive numbers is represented in binary form by indications having a value of 3 added to the indications normally representing the number, the inversion of the number causes negative numbers to be represented by indications which are more negative by a value of "3" than the normal binary indications obtained by the counter 260. For example, as shown in FIGURE 14, the value of −4 is represented in "excess 3" code by 1001. In the normal binary code shown in FIGURE 15, an indication of 1001 will represent a value of −7.

In order to convert the binary number from the counter 260 into a binary-coded decimal number in the "excess three" code, the polarity of the number must first be determined. As disclosed in detail in co-pending application Serial No. 217,478, each integrator can receive increments from a maximum of only 7 integrators when the integrator is presented for computation. This causes the cumulative value of the Δy increments for each integrator to lie within a range of −7 to +7 every time that the integrator is presented for computation. For positive values up to +7, the counter 260 produces a voltage indicative of the binary value "0" in the binary position of highest significance. This is indicated in the chart shown in FIGURE 15. This signal passes through the gate circuit 268 shown in FIGURE 2. For negative values up to −7, the counter 260 produces a voltage indicative of the binary value "1" in the pulse position of highest significance. This signal passes through the gate circuit 266 in FIGURE 2.

The signals from the gate circuit 268 pass to the grid of the left tube in the multivibrator 282 and cause the tube to be triggered into a state of non-conductivity such that a high voltage is produced on the plate of the tube. The signal from the gate circuit 268 also passes to the grid of the left tubes in the multivibrators 292 and 286 and to the grids of the right tubes in the multivibrators 288 and 290, so as to trigger these multivibrators into states of operation representing the indications 0011, where the least significant digit is at the right.

The multivibrators 292, 286, 288 and 290 are triggered into operation by a signal from the gate circuit 268 since a signal is also introduced to the multivibrators from the coil 62 through suitable lines (not shown). As shown in FIGURE 15, the indications 0011 represent a value of +3 in binary form. These indications are combined in the adder 296 with the indications from the counter 260 to obtain output indications representing the cumulative value of the $\Delta y$ increments for an integrator in the "excess three" code.

Similarly, a signal passing through the gate circuit 266 causes the right tube in the multivibrator 282 to be triggered into a state of non-conductivity. Since this signal represents a negative value in the $\Delta y$ increments for an integrator, a relatively high voltage is produced on the plate of the right tube in the multivibrator 282 to represent such a polarity. The signal passing through the gate circuit 266 also causes the left tubes in the multivibrators 292, 288 and 290 and the right tube in the multivibrator 286 to be triggered into non-conductivity in a pattern represented by 1101 where the least significant digit is at the right. These indications represent a value of −3 in binary form. Since the adder 296 combines these conversion indications with the $\Delta y$ indications from the counter 260, the adder 296 provides output indications representing the cumulative value of the $\Delta y$ increments for each integrator in the "excess three" code. The adder 296 is a four-digit parallel binary adder as is well known in the prior art. One satisfactory form for adder 296 is shown and described on page 41 of a book entitled "Automatic Digital Calculators," by Booth and Booth, published in 1953 by Butterworths Scientific Publications, London.

The output indications from the adder 296 are introduced to the multivibrators 300, 302, 304 and 306 (FIGURES 2 and 3) and are in turn applied to the adder 324 (FIGURE 3). Since the adder 324 is connected to the plate of the left tube in the multivibrator 318, it becomes operative only when a relatively high voltage is produced on the tube plate. As previously disclosed, the start multivibrator 318 corresponds to the start multivibrator 98 shown in FIGURE 1. During the first 22 positions for each integrator, the left tube in the multivibrator 318 is conductive. Upon the occurrence of the first pulse in the channel 16 after the first 22 positions for each integrator, a pulse passes through the gate circuit 320 to trigger the left tube in the multivibrator 318 into a state of non-conductivity. A pulse passes through the gate circuit 320 after the first 22 positions for each integrator because of the introduction of a relatively high voltage to the gate circuit through the line 322 from the counter 234 to prepare the gate circuit for opening.

When the left tube in the start multivibrator 318 becomes cut off upon the appearance of the "start" pulse in the channel 16, a relatively high voltage is introduced from the plate of the tube to the gtae circuit 388 (FIGURE 4). This voltage passes through the gate circuit during the pulse position following the start pulse because of the connection from the coil 62 to the input terminal of the gate circuit. The signal passing through the gate circuit 388 of FIG. 4 causes the left tube in the multivibrator 386 to become triggered into a state of conductivity in the pulse position following the start pulse. For example, when the start pulse occurs in the channel 16 in pulse position 27 for an integrator, the left tube in the multivibrator 318 becomes triggered into a state of non-conductivity at pulse position 27 and the left tube in the multivibrator 386 becomes triggered into a state of non-conductivity at pulse position 28.

When the left tube in the multivibrator 318 becomes cut off, it remains cut off until pulse position 48 for the integrator, at which time a signal is introduced to the grid of the right tube in the multivibrator 318 through the line 340 (FIGURE 3) from the counter 234 to cut off the tube. Similarly, when the left tube in the multivibrator 386 becomes cut off for an integrator, it remains cut off until pulse position 1 of the following integrator.

At the first pulse position of the following integrator, a signal passes from the counter 234 through the line 390 (FIGURE 4) to the grid of the right tube in the multivibrator 386 to cut off the tube.

When the left tube in the multivibrator 318 becomes cut off, the signals from the multivibrators 300, 302, 304 and 306 (FIGURE 3) are combined by the adder 324 with the signals passing through the gate circuits corresponding to the circuits 310, 312, 314 and 316. The gate circuits corresponding to the circuits 310, 312, 314 and 316 become opened after the appearance of the "start" pulse because of their connection to the plate of the left tube in the multivibrator 318. When the gate circuits become opened, they pass to the adder 324 the signals appearing in the channels 14, 16, 18 and 20.

In the first pulse position after the start pulse, the signals in the channels 14, 16, 18 and 20 indicate in the "excess 3" code the least significant digit of the value of the dependent $y$ for the integrator undergoing computation. These $y$ signals are combined in the adder 324 with the signals representing the cumulative value of the $\Delta y$ increments for the integrator, as indicated in the multivibrators 300, 302, 304 and 306. The resultant signals produced by the adder 324 provide an indication of the new value of $y$ for the least significant decimal digit of the integrator.

The combination of the signals in the channels 14, 16, 18 and 20 and the indications in the multivibrators 300, 302, 304 and 306 occurs during the time that the integrator section is being advanced from one pulse position to the next. For example, the combination of the information in the channels 14, 16, 18 and 20 in pulse position 27 with the information in the multivibrators 300, 302, 304 and 306 occurs before the end of pulse position 28 for the integrator. This combination occurs in one pulse position even though the indications in four channels must be combined and carry indications must be transferred from one channel to the next.

The operation of the adder 324 in obtaining a new value of $y$ can be given by the following logical equations:

$C_2' = (C_1 + A_1'B_1')(A_1' + B_1')$
$C_3 = (C_2 + A_2B_2)(A_2 + B_2)$
$C_4' = (C_3' + A_3'B_3')(A_3' + B_2')$
$C_o = (C_4 + A_4B_4)(A_4 + B_4)$
$W_1' = (C_2 + A_1'B_1'C_1')(A_1' + B_1' + C_1')$
$W_2 = (C_3' + A_2B_2C_2)(A_2 + B_2 + C_2)$
$W_3' = (C_4 + A_3'B_3'C_3')(A_3' + B_3' + C_3')$
$W_4 = (C_o' + A_4B_4C_4)(A_4 + B_4 + C_4)$

In the above equations, $B_1$ = a relatively high voltage on the plate of the left tube in the multivibrator 202 to represent an indication of "1" in the channel 14 for a pulse position;

$B_2$, $B_3$ and $B_4$ = high voltages on the plates of the left tubes in the multivibrators 206, 210 and 214, respectively, to represent indications of "1" in the channels 16, 18 and 20 for a pulse position;

$A_1$ = a relatively high voltage on the plate of the left tube in the multivibrator 300 to represent the integer "1" for the least significant digit of the $\Delta y$ increments;

$A_2$, $A_3$ and $A_4$ = relatively high voltages on the plates of the left tubes in the multivibrators 302, 304 and 306;

$C_1$ = a relatively high voltage on the plate of the left tube in the multivibrator 393 shown in FIGURES 3 and 4 to indicate a carry from a pulse position of lesser significance to a pulse position of increased significance;

$C_2$ = a carry resulting from the binary addition of $C_1$, $B_1$ and $A_1$;

$C_3$ = a carry resulting from the binary addition of $A_2$, $B_2$ and $C_2$;

$C_4$ = a carry resulting from the addition of $A_3$, $B_3$ and $C_3$; and $C_o$ = the output carry resulting from addition of $A_4$, $B_4$ and $C_4$;

$W_1$ = the result obtained by the addition of $A_1$, $B_1$ and $C_1$ and represents a relatively high voltage indicative of the integer "1";

$W_2$, $W_3$ and $W_4$ = the results obtained by the addition of the different values in the pulse positions corresponding to the channels 16, 18 and 20, respectively;

$A_1'$ = the complement of $A_1$ to represent a relatively high voltage on the plate of the right tube in the multivibrator 300; and $A_2'$, $A_3'$, $A_4'$, $B_1'$, $B_2'$, $B_3'$, $B_4'$, $C_1'$, $C_2'$, $C_3'$, $C_4'$, $C_0'$, $W_1'$, $W_2'$, $W_3'$, and $W_4'$ represent the complements of the corresponding indications having no prime representations. In the above equations $C_2$, $C_3$ and $C_4$ represent components which are not specifically shown, but which are included in the box representing the adder 324. Although these components are not specifically shown, it is believed that their construction and operation will be understood by persons skilled in the art from the logical equations listed above and from the chart shown in FIGURE 16.

A carry indication is obtained when the addition of different values causes a full binary indication of +2 to be obtained for a pulse position. In binary form, an indication of "+2" is equivalent to a value of "0" for the pulse position and a carry of "+1" to the next highest digit. For example, when a binary indication of "1" for y in the 26th position of the channel 14 for an integrator is added to a binary indication of "1" for Δy in the multivibrator 300, the resultant value may be "0" in the channel 14 and a carry of "1" into the channel 16. This carry would be provided by an amplifier representing $C_2$ in the above equations.

A carry may also be provided from a first pulse position to the next position when a carry from the position immediately preceding the first position is added to the integer "1" indicating the value of either y or Δy for the first position. For example, a carry may be provided from the channel 14 to the channel 16 as disclosed in the previous paragraph. The addition of this carry indication of "1" representing the value of the dependent quantity y for pulse position 26 in the channel 16 causes a carry to be made into the channel 18. This carry would be indicated by an amplifier corresponding to $C_3$ in the above equation.

It should be further appreciated that the logical equations disclosed above are general equations which control the operation of the adder 324 in the different pulse positions. Since no carry is to be utilized by the addition of the dependent quantity y and the incremental quantity Δy in the least significant digit, the multivibrator 393 does not become operative until after this position. The multivibrator 393 is made inoperative at this pulse position because of the operation of the gate circuits 382 (FIGURE 4) and 384, which have a voltage applied to them from the plate of the left tube in the multivibrator 386. Since the left tube in the multivibrator 386 is triggered into a state of nonconductivity one pulse position after the triggering of the left tube in the multivibrator 318, signals cannot pass through the gate circuits 382 and 384 until after the addition of y and Δy in the least significant digit.

The new value of the dependent quantity y in the least significant digit is introduced by the adder 324 to the multivibrators 272, 274, 276 and 278. Sometimes, upon the addition of signals representing the values of y and Δy, a carry is obtained from the last digit. For example, when a value of +7 in the "excess 3" decimal code is added to a value of +5 in the same code, a carry is produced in the last position corresponding to the information in the channel 20. This carry is represented by the term $C_0$ in the logical equations disclosed above and in the chart shown in FIGURE 16 and is indicated by a high voltage which is introduced to the grid of the left tube in the multivibrator 282. This voltage causes the left tube in the multivibrator 282 to become cut off and a relatively high voltage to be produced on the plate of the tube.

At the next pulse position, the high voltage on the plate of the left tube in the multivibrator 282 passes through the gate circuit 382 and causes the left tube in the multivibrator 393 to become cut off. Since the voltage from the multivibrator 393 is introduced to the adder 324, the carry indications produced by the adder 324 are reintroduced to the adder after a delay of one pulse position. At this time, information relating to the values of y and Δy in the decimal digit of next highest significance are being combined by the adder 324. In this way, a carry is obtained from one decimal digit to the next so that a proper addition can be obtained.

As discussed in connection with the simplified embodiment shown in FIGURE 1, indications relating to the dependent quantity y and to the differential combination yΔx for each integrator are alternately presented in successive pulse positions in the channels 14, 16, 18 and 20. For example, indications relating to the value of y for decimal digits of increasing significance may be successively presented in pulse positions 26, 28, 30, etc. in the channels 14, 16, 18 and 20. Similarly, indications relating to the cumulative value of the differential combination yΔx for an integrator may be successively presented in pulse positions 27, 29, 31, etc. in the channels 14, 16, 18 and 20.

Since the adder 324 alternately operates to obtain new values for y and yΔx for each integrator, some control must be provided to insure that the values of y and yΔx do not become mixed. This control is provided by the operation of the multivibrator 358 shown in FIGURE 3. This multivibrator corresponds to the multivibrator 90 shown in FIGURE 1. The operation of the multivibrator 358 is in turn controlled by the gate circuits 362 and 364. Because of the connection to input terminals of the gate circuits 362 and 364 from the plate of the left tube in the multivibrator 318, the multivibrator 358 does not become operative until after the appearance of the "start" pulse in the channel 16.

When the "start" pulse appears in the channel 16, the first clock signal induced in the coil 62 after the "start" pulse passes through the gate circuit 364 and causes the left tube in the multivibrator 358 to become cut off. The resultant high voltage on the plate of the left tube in the multivibrator 358 is introduced to the gate circuit 362 to prepare the gate circuit for the passage of a signal upon the production of the next clock signal by the coil 62. This clock signal passes through the gate circuit 362 and the "or" network 360 to the grid of the right tube in the multivibrator 358 and causes the tube to become cut off.

Since the voltage on the plate of the right tube in the multivibrator 358 is introduced to the gate circuit 364, the gate circuit becomes prepared to pass the next clock signal from the coil 62. In this way, the left and right tubes in the multivibrator 358 become alternately triggered into states of non-conductivity upon the introduction of successive clock signals from the coil 62. At pulse position 48 for each integrator, a signal passes from the counter 234 through the line 340 and the "or" network 360 to the grid of the right tube in the multivibrator 358. This signal causes the right tube in the multivibrator 358 to become cut off if it happens to be conductive at that time.

In this way, the left tube in the multivibrator 358 becomes prepared for an initial triggering after the appearance of the "start" pulse in the next integrator. By insuring that the left tube in the multivibrator 358 becomes initially triggered for each integrator, coordination is provided between the operation of the multivibrator 358 and the introduction of information to the adder 324. This results from the fact that information relating to the dependent quantity y appears in the channels 14, 16, 18 and 20 in the first pulse position after the "start" pulse for each integrator.

The relatively high voltage produced in alternate pulse positions on the plate of the left tube in the multivibrator 358 is introduced to the gate circuits 370 and 372. Since the gate circuits 370 and 372 are also respectively connected to the plate of the left and right tubes in the multivibrator 280, either the gate circuit 370 or the gate circuit 372 is prepared for opening at all times.

As shown in FIGURE 2, the grids of the left and right tubes in the multivibrator 280 respectively receive the signals passing through the gate circuits 266 and 268. The signals through these gate circuits respectively represent $\Delta y$ increments of negative and positive polarity. Because of this, a relatively high voltage on the plate of the left tube in the multivibrator 280 indicates that the cumulative value of the $\Delta y$ increments for an integrator are negative. Similarly, a relatively high voltage is produced on the plate of the right tube in the multivibrator 280 when the cumulative value of the $\Delta y$ increments is positive. As a result of the operation of the gate circuits 266 and 268, the multivibrator 280 becomes triggered into one state of operation or the other at pulse position 23 for each integrator. The multivibrator then remains in this state during the remaining pulse positions for the integrator.

As disclosed in co-pending application Serial No. 217,478, the value of the $\Delta y$ increments for each integrator appears only in the first pulse positions for the integrator. In the remaining pulse positions the indication as to the sign of the $\Delta y$ increments is repeated. Since the analyzer disclosed in the co-pending application Serial No. 217,478 operates on a binary basis, a binary indication of "0" is added to the value of y in successive pulse positions when the cumulative value of the $\Delta y$ increments is positive. In like manner, a binary value of "1" is added in successive pulse positions when the cumulative value of the $\Delta y$ increments for an integrator is negative.

For reasons which wil be disclosed in detail hereinafter, indications of 0011 are added to the value of y after the first decimal digit for an integrator in the analyzer constituting this invention to represent that the cumulative value of the $\Delta y$ increments for the integrator is positive. Such indications are introduced to the adder 324 by the multivibrators 300, 302, 304 and 306 (FIGURE 3) when a signal passes through the gate circuit 372. Similarly, indications of 1100 are added to the value of y after the first decimal digit to indicate that the cumulative value of the $\Delta y$ increments for an integrator is negative. This pattern is produced in the multivibrators 300, 302, 304 and 306 when a signal passes through the gate circuit 372.

It has already been disclosed that indications relating to the cumulative value of $y\Delta x$ for each integrator are presented in alternate pulse positions in the channels 14, 16, 18 and 20. These indications are presented to the adder 324, which combines them with the signals representing the $y\Delta x$ increment. However, in order to have a $y\Delta x$ increment, a $\Delta x$ increment must be obtained. The gate circuits 331 (FIGURE 3), 332 and 334 and the multivibrators 338 and 350 operate to determine the occurrence of each $\Delta x$ increment and the polarity of each such increment.

Since the pulse controlling the occurrence of each $\Delta x$ increment for an integrator occurs in one of the first 22 pulse positions for the integrator, the gate circuit 331 is prepared for opening during these positions. The gate circuit is so prepared by the introduction of a relatively high voltage through the line 232 from the counter 234. The voltage on the plate of the left tube in the multivibrator 210 is also introduced to the gate circuit 331 since the coding pulse occurs in the channel 18. When a relatively high voltage is simultaneously produced on the plate of the left tube in the multivibrator 218, a signal passes through the gate circuit 331 to indicate that a $\Delta x$ increment has actually occurred for the integrator undergoing computation.

The signal passing through the gate circuit 331 causes the left tube in the multivibrator 338 to become cut off and a relatively high voltage to be produced on the tube plate. This high voltage continues during the remaining pulse positions of the integrator. At pulse position 48 of each integrator, the multivibrator 338 becomes cut off as a result of the introduction of a signal through the line 340 from the counter 234. In this way, the multivibrator 338 indicates the actual occurrence of a $\Delta x$ increment during the time that the information relating to the cumulative value of $y\Delta x$ for the integrator is presented to the adder 324.

The voltages on the plate of the left tube in the multivibrator 210 and on the line 232 are introduced to the gate circuits 332 and 334 as well as to the gate circuit 331. This causes the gate circuits 332 and 334 to be prepared for opening at a particular one of the first 22 positions for each integrator corresponding to the position in which the $\Delta x$ coding pulse appears in the channel 18. When a relatively high voltage is produced on the plate of the left tube in the multivibrator 222 at the same time as the introduction of the coding pulse to the gate circuit 332, a signal passes through the circuit to indicate that any $\Delta x$ increment is positive.

The signal from the gate circuit 332 passes to the grid of the left tube in the multivibrator 350 and cuts off the tube. The left tube in the multivibrator 350 then remains cut off during the remaining pulse positions for the integrator. At pulse position 48 for the integrator, a signal is introduced to the grid of the right tube in the multivibrator 350 through the line 340 and the "or" network 351 to cut off the tube and make the left tube in the multivibrator conductive. In this way, the left tube in the multivibrator 350 remains cut off for a positive $\Delta x$ increment for an integrator during all of the time that the information relating to the cumulative value of the $y\Delta x$ increments for the integrator appears in the channels 14, 16, 18 and 20.

The induction of a relatively low voltage in the coil 60 causes the right tube in the multivibrator 222 to become cut off. When the right tube in the multivibrator 222 becomes cut off at the same time that a coding pulse appears in the channel 18 in one of the first 22 positions for an integrator, a signal passes through the gate circuit 334 and the "or" network 351. This signal provides an indication that any $\Delta x$ increment for the integrator undergoing computation is negative. The signal passes to the grid of the right tube in the multivibrator 350 and causes the tube to become cut off. The right tube in the multivibrator 350 then remains cut off during the remaining pulse positions for the integrator.

Upon the simultaneous production of relatively high voltages on the plates of the left tubes in the multivibrators 338 and 350, a signal passes through the gate circuit 352. This signal provides an indication that a $\Delta x$ increment has actually occurred and that the increment has a positive polarity. The signal from the gate circuit 352 is introduced to the gate circuit 329.

Because of its connection to the plate of the right tube in the multivibrator 358, the gate circuit 329 opens at alternate pulse positions to provide for the passage of a signal to the adder 324. The adder 324 then combines the signals in the gate circuits such as the circuits 310, 312, 314 and 316 with the signals from the delay lines 325, 326, 327 and 328 to produce new indications representing the cumulative value of the $y\Delta x$ increments. As previously disclosed, the delay lines 325, 326, 327 and 328 delay by one pulse position the value of the dependent quantity y in the channels 14, 16, 18 and 20 so that they will coincide with the signals relating to the cumulative value of the $y\Delta x$ increments in the channels 14, 16, 18 and 20. The combination of a particular $y\Delta x$ increment with the cumulative value of the $y\Delta x$ increments upon the occurrence of a positive $\Delta x$ increment is fully disclosed in co-pending application Serial No. 217,478 and in co-pending Serial No. 362,584, filed June 18, 1953, now Patent No. 2,900,135, by Reno V. Benaglio et al.

In like manner, a signal passes through the gate circuit 354 when relatively high voltages simultaneously occur on the plate of the left tube in the multivibrator 338 and on the plate of the right tube in the multivibrator 350. This signal indicates that a Δx increment has actually occurred and that the polarity of the increment is negative. In alternate pulse positions, the signal from the gate circuit 354 passes through the gate circuit 330 to the adder 324. The signal operates on the adder to cause the indications from the delay lines 325, 326, 327 and 328 to be inverted. Inversion of these indications upon the occurrence of a negative Δx increment results from the fact that (y)(−Δx)=(−y)(Δx). The inversion of the indications relating to y for a negative Δx increment is fully disclosed in co-pending application Serial No. 217,478 disclosed above and in co-pending application Serial No. 362,584, filed June 18, 1953, by Reno V. Benaglio et al. Since it is fully disclosed in the co-pending applications it is not fully disclosed in this application and fully shown in the drawings in the interest of simplification.

The indications obtained by the adder 324 in successive pulse positions are introduced to the multivibrators 272, 274, 276 and 278 (FIGURE 4). The resultant indications produced in the multivibrators 272, 274, 276 and 278 then pass to the adder 296 (FIGURE 4) for combination with the signals from the multivibrators 292, 286, 288 and 290. As will be disclosed in detail hereafter, these multivibrators provide a corrective factor which is necessary to obtain proper decimal indications when the analyzer operates in the "excess three" decimal code.

The corrective factor provided by the multivibrators 292, 286, 288 and 290 is dependent upon a carry or lack of carry from the addition of information in the adder 324. For example, when the combination of signals in the adder 324 causes a carry $C_c$ to be introduced from the adder to the multivibrator 282 (FIGURE 4), a corrective factor of 0011 is provided by the multivibrators 292, 286, 288 and 290. Thus, the multivibrators 292 (FIGURE 2) and 286 provide indications of the integer "1" and the multivibrators 288 and 290 provide indications of the binary value "0."

Sometimes a carry is not obtained from the adder 324 when signals are combined in the adder. A lack of a carry from the adder 324 is indicated by the passage of a signal through the gate circuit 378 and the "or" network 279 and by a relatively high voltage on the plate of the right tube in the multivibrator 282. When this occurs, the multivibrators 292, 286, 288 and 290 introduce a corrective factor of 1101 to the adder 296, where the least significant digit is at the right.

Since the analyzer constituting this invention operates in the "excess three" decimal code, each number has a corrective value of 3 applied to it. Thus, when the adder 324 adds two positive numbers, each number has a corrective factor of +3 added to it. The resultant number obtained by the adder 324 has a corrective factor of +6. Although the adder 324 combines two numbers in the "excess three" code, each number is still formed from a plurality of binary indications. In the binary code, a carry cannot be obtained until a binary number equivalent to a decimal indication of "16" has been obtained. Since an indication of "16" is greater by a value of "6" than a value of "10" required to obtain a carry in normal decimal operation, the excess factor of +6 obtained by the adder 324 makes up this difference. However, the new number obtained by the adder 324 now has to have a value of +3 added to it to return it to the "excess three" code. Such a corrective factor of +3 is represented in binary form by 0011 and is added in the adder 296 to the indications from the adder 324 to return these indications to the proper value.

When an output carry does not occur upon the addition of two numbers in the adder 324, a value having a corrective factor of +6 is obtained. Since only a corrective factor of +3 is required to convert a binary number into the "excess three" code, a value of 3 must be subtracted from the number obtained by the adder 324. This value is obtained by inverting the indications of 0011 representing +3 into indications of 1100 and adding 1 to the least significant digit. The resultant indications of 1101 represents a value of −3 in binary form. The indications of 1101 is added in the adder 296 to the indications from the adder 324 to return these indications to their proper value.

The operation of the multivibrators 292, 286, 288 and 290 to produce indications of 0011 and indications of 1101 have been previously disclosed in detail. As previously disclosed and shown in FIGURE 2, the operation of the multivibrators 292, 286, 288 and 290 to obtain these indications is controlled by the signals from the "or" networks 283 and 279. As shown in FIGURES 2 and 4, a signal passes through the gate circuit 376 and the "or" network 283 to produce a pattern of 0011 in the multivibrators 292, 286, 288 and 290 when a carry indication is obtained by the adder 324. Similarly, a signal passes through the gate circuit 378 and the "or" network 279 to produce a pattern of 1101 in the multivibrators 292, 286, 288 and 290 when no carry is obtained in the adder 324.

The resultant indications obtained by the adder 296 in combining the indications in the multivibrators 272, 274, 276 and 278 and in the multivibrators 292, 286, 288 and 290 represent in alternate positions the new value of the dependent quantity y for each integrator. These indications pass from the adder 296 through the gate circuits such as the circuits 394, 395, 396 and 397 (FIGURE 4) to the multivibrators 398, 244, 250 and 399. The indications then pass from the multivibrators 398, 244, 250 and 399 to the coils 30, 36, 42 and 48 for the recordation of the information in the channels 14, 16, 18 and 20, respectively.

The information passing through the gate circuits such as the circuits 310, 312, 314 and 316 to represent the value of y for each integrator is delayed by one pulse position. The information is delayed by the delay lines 325, 326, 327 and 328, which may be bistable multivibrators. The information then passes to the adder 324 (FIGURE 3) for combination with the signals provided in the channels 14, 16, 18 and 20 to represent the cumulative value of the yΔx increments for the integrator. The indications produced by the adder 324 to represent the new cumulative value of the yΔx increments are then corrected in the adder 296 by a factor of +3 or −3. The resultant indications are introduced to the multivibrators 398, 244, 250 and 399 (FIGURE 4) for recordation in the channels 14, 16, 18 and 20, respectively.

When a Δx increment does not occur for an integrator, neither the gate circuit 329 (FIGURE 3) nor the gate circuit 330 is able to open in alternate pulse positions. This prevents the value of y from being either added to or subtracted from the cumulative value of the yΔx increments for the integrator. However, since a Δx increment has not occurred, the voltage on the plate of the right tube in the multivibrator 338 is relatively high. This causes the gate circuit 366 to open in the alternate pulse positions in which a relatively high voltage is introduced to the gate circuit from the plate of the right tube in the multivibrator 358. As previously disclosed, a relatively high voltage is produced on the plate of the right tube in the multivibrator 358 at the alternate pulse positions corresponding to the presentation of the yΔx increments for computation.

Upon the passage of a signal through the gate circuit 366 and the "or" network 368, the left tubes in the multivibrators 300 and 302 and the right tubes in the multivibrator 304 and 306 become triggered into states of nonconductivity. This causes the multivibrators 300, 302, 304 and 306 to produce a pattern of indications representing 0011, where the least significant digit is at the right. This corresponds to an indication of the integer "+3" in binary form. These indications are then combined in the adder 324 with the indications representing the cumulative value of the $y\Delta x$ increments in the channels 14, 16, 18 and 20.

As will be seen in the chart shown in FIGURE 14, no carry indication is obtained when indications of 0011 are combined with any positive number between 0 and 9 or with any negative number between 0 and −9. Since no carry indication is obtained in the adder 324 by the addition of 0011, the multivibrators 292, 286, 288 and 290 are triggered into a pattern representing 1101 by a signal passing through the gate circuit 378 and the "or" network 279. This corresponds to an indication of −3. In this way, the adder 296 subtracts the value of 3 that is added to the $y\Delta x$ increments in the adder 324. The resultant indications obtained by the adder 296 corresponds to the indications introduced to the adder 324 from the channels 14, 16, 18 and 20. As a result, the indications representing the cumulative value of the $y\Delta x$ increments for each integrator are circulated in the channels 14, 16, 18 and 20 when a $\Delta x$ increment is not obtained for the integrator.

Sometimes an overflow occurs in the cumulative value of the $y\Delta x$ increments stored in the channels 14, 16, 18 and 20. For example, if a decimal value of "1,000" is the maximum value that can be stored in the channels 14, 16, 18 and 20 for an integrator, an overflow occurs in the channel 20 when a decimal value of "6" representing a $y\Delta x$ increment for the integrator is added to a decimal value of "996" previously stored in the channel for the integrator.

An overflow in the cumulative value of the $y\Delta x$ increments stored in the channels 14, 16, 18 and 20 for an integrator can only occur upon a combination of the indications in pulse position 47 for the integrator. The overflow can occur only upon such a combination since the information relating to the digit of highest significance for the $y\Delta x$ increments occurs in pulse position 47. When an overflow occurs in pulse position 47, it is carried into pulse position 48.

Since an overflow from the channel 20 can occur only from pulse position 47 to pulse position 48 for each integrator, the gate circuits 428 and 438 (FIGURE 5) open only at position 48. This results from the connection made from the counter 234 through the line 340 to the gate circuits 428 and 438. As disclosed above, an overflow can occur only when a $y\Delta x$ increment is added to the cumulative value of the $y\Delta x$ incremtnts previously obtained for the integrator. Since a $y\Delta x$ increment for an integrator can be obtained only upon the actual occurrence of a $\Delta x$ increment, a connection is made from the plate of the left tube in the multivibrator 338 to input terminals of the gate circuits 428 and 438. This prevents the gate circuits 428 and 438 from opening except upon the actual occurrence of a $\Delta x$ increment.

The gate circuit 428 is able to open only when a relatively high voltage is introduced to it from the plate of the left tube in the multivibrator 282 to indicate a positive carry from the adder 324. A positive carry is produced by the adder 324 to represent an overflow when a positive increment of $y\Delta x$ is added to indications having a positive polarity and representing the cumulative value of $y\Delta x$. A positive $y\Delta x$ increment is obtained when both $y$ and $\Delta x$ are positive and when both $y$ and $\Delta x$ are negative. This results from the fact that $$(y)(\Delta x) = (-y)(-\Delta x)$$

The gate circuit 430 passes a signal when a carry is produced by the adder 324 in pulse position 48 and $y$ and $\Delta x$ are both positive. The gate circuit passes a signal for such a set of conditions because a relatively high voltage on the plate of the left tube in the multivibrator 350 indicates a positive $\Delta x$ increment and a relatively high voltage on the plate of the right tube in the multivibrator 404 indicates a positive value of $y$. The operation of the multivibrator 404 to provide such an indication will be disclosed in detail hereafter. The signal passing through the gate circuit 430 also passes through the "or" networks 434 and 436 to the coil 52 for recordation in the channel 22. As previously disclosed, successive pulse positions in the channel 22 are utilized to indicate whether or not an overflow has occurred in the cumulative value of the $y\Delta x$ increments for the different integrators.

Similarly, the gate circuit 432 opens when a carry is made by the adder 324 into pulse position 48 for an integrator and the values of $y$ and $\Delta x$ are both negative. The simultaneous occurrence of such conditions is indicated by relatively high voltages on the output terminals of the gate circuit 428, the plate of the right tube in the multivibrator 350 and the plate of the left tube in the multivibrator 404. Since such a simultaneous occurrence of conditions indicates that an overflow has actually occurred in the indications provided in the channels 14, 16, 18 and 20, a signal passes from the gate circuit 432 through the "or" networks 434 and 436 to the coil 52 for recordation in the channel 22.

As will be seen in the chart shown in FIGURE 14, negative numbers between −6 and −9 are represented in the "excess three" code by an indication of "0" in the last pulse position. It will be further seen that a negative count occurs by substituting the indication "0" for the indication "1" in pulse positions of increasing significance. This results from the fact that a negative number can be indicated by an inversion of the corresponding positive indications and the addition of a binary indication "1" to the pulse position of least significance.

For the above reasons, a negative overflow can occur when no output carry is produced by the adder 324. Since such an overflow can occur only for negative numbers, a negative increment of $y\Delta x$ must be added to a negative number representing the cumulative value of the $y\Delta x$ increments in the channels 14, 16, 18 and 20. A negative increment of $y\Delta x$ can be obtained by having either $y$ negative and $\Delta x$ positive, or by having $y$ positive and $\Delta x$ negative. In other words, $$(-y)(\Delta x) = (y)(-\Delta x)$$

The gate circuits 438, 440 and 442 provide a determination as to whether an overflow in the negative value of the $y\Delta x$ increments has occurred when such increments are negative. Since the gate circuit 438 is connected through the line 340 to the counter 234, it can open only in pulse position 48 for each integrator. As previously disclosed, an overflow in the cumulative value of $y\Delta x$ for each integrator can occur only in this pulse position. Because of its connection to the plate of the left tube in the multivibrator 338, the gate circuit becomes opened only when a $\Delta x$ increment has actually occurred for an integrator. In addition, the gate circuit 438 can become opened only when an output carry indication is not provided by the multivibrator 282. This results from the connection between the gate circuit and the plate of the right tube in the multivibrator 282.

The signals passing through the gate circuit 438 are introduced to the gate circuits 440 and 442. The gate circuit 440 passes a signal when a negative $y\Delta x$ increment is produced by a negative value of $y$ and a positive value of $\Delta x$. This results from the connections respectively made to input terminals of the gate circuit from the multivibrators 404 and 350. Similarly, the gate circuit 442 becomes opened only when $y$ is positive and $\Delta x$ is negative. The signals from the gate circuit 440 and 442 pass through the "or" networks 434 and 436 to the coil 52 for the recordation of a positive signal in the channel 22.

The operation of the gate circuits 428, 430 and 432 and the gate circuits 438, 440 and 442 in producing an overflow indication in the channel 22 for an integrator can be given by the following logical equation:

$$Z_t = P_{48}B_6[(B_2'B_5 + B_2B_5')C_c + B_2B_5 + B_2'B_5')C_c']$$

In the above equation, $Z_t$ = a pulse of relatively high voltage introduced to the coil 52 to indicate an overflow in the cumulative value of the $y\Delta x$ increments for an integrator;

$B_6$ = a relatively high voltage on the plate of the left tube in the multivibrator 338 to indicate that a $\Delta x$ increment has actually occurred for the integrator;

$B_2$ = a relatively high voltage on the plate of the left tube in the multivibrator 404 to indicate that the value of $y$ for the integrator is negative;

$B_5$ = a relatively high voltage on the plate of the left tube in the multivibrator 350 to indicate that any $\Delta x$ increment for the integrator is positive;

$C_c$ = a relatively high voltage on the plate of the left tube in the multivibrator 282 to indicate that a positive carry has been obtained from the adder 324; and $B_6'$, $B_2'$, $B_5'$, $C_c'$ = relatively high voltages on the plates of the right tubes in their respective multivibrators to indicate an inverse of that provided by high voltages on the plates of the left tubes in the multivibrators.

The signals passing to the coil 52 for recordation in the channel 22 indicate only that an overflow has occurred in the cumulative value of the $y\Delta x$ increments for an integrator. Such a signal does not indicate whether the increments are positive or negative. The polarity of each such overflow is indicated by the passage of signals to the coil 58 for recordation in the channel 24. When a positive signal passes to the coil 58, an indication is provided that a positive overflow in the $y\Delta x$ increments has occurred. The absence of such a positive signal indicates that a negative overflow in the cumulative value of the $y\Delta x$ increments has occurred.

In co-pending application, Serial Number 217,478, a coding pulse is provided in pulse position 48 of the channel containing the $y\Delta x$ information for each integrator. Since this channel corresponds to the channel 18 in the analyzer constituting this invention, coding information is inserted in the channel 18 at pulse position 48 for each integrator. This coding information provides an indication as to whether or not the polarity of the overflow indications for the $y\Delta x$ increments have to be inverted. The appearance of a positive pulse in pulse position 48 for an integrator indicates that the polarity of the cumulative value of the $y\Delta x$ increments for the integrator has to be inverted. Similarly, the absence of a pulse in the channel 18 in position 48 for an integrator indicates that the polarity of the cumulative value of $y\Delta x$ does not have to be inverted.

Since the coding information in the channel 18 in pulse position 48 for each integrator must be retained during computation, a circuit is provided for recirculation of this information in the channel 18. This circuit includes the coil 38 (FIGURE 5), the multivibrator 210, the gate circuit 402, the "or" network 445a and the coil 42. The gate circuit 402 opens at pulse position 48 for each integrator to pass a positive coding signal in the channel 18 since the gate circuit is connected through the line 340 to the counter 234.

The passage through the gate circuit 402 of a positive coding pulse at pulse position 48 for an integrator causes the left tube in the multivibrator 406 to become triggered into a state of non-conductivity. The left tube in the multivibrator 406 then remains cut off for one pulse position. At pulse position 1 of the following integrator, a signal is introduced to the grid of the right tube in the multivibrator 406 through the line 390 from the counter 234. This signal causes the right tube in the multivibrator 406 to become cut off. In this way, the left tube in the multivibrator 406 can become cut off for a duration of only one pulse position in each integrator.

The voltage on the plate of the right tube in the multivibrator 406 is introduced to the gate circuit 416. Since the right tube in the multivibrator 406 remains cut off at pulse position 48 for an integrator only when the cumulative value of the $y\Delta x$ increments for the integrator is positive, the gate circuit 416 becomes open only when the polarity of the $y\Delta x$ increments does not have to be inverted. The gate circuit 416 can become open only at pulse position 48 for each integrator because of its connection through the line 340 to the counter 234.

When the gate circuit 416 opens, a signal passes to the gate circuits 408 and 412. A signal then passes through the gate circuit 412 when the values of $y$ and of $\Delta x$ are both positive in the $y\Delta x$ increment just obtained for the integrator. This results from the connection to input terminals of the gate circuit from the plate of the right tube in the multivibrator 404 and the plate of the left tube in the multivibrator 350. When the gate circuit 412 opens, the signal passes through the gate circuit and the "or" networks 420 and 422 to the coil 58 for recordation in the channel 24. This signal provides an indication that a positive overflow has occurred in the cumulative value of the $y\Delta x$ increments stored in the channels 14, 16, 18 and 20.

Similarly, the gate circuit 408 opens when both $y$ and $\Delta x$ are negative for the $y\Delta x$ increment just obtained for the integrator undergoing computation. Since both $y$ and $\Delta x$ are negative, a positive $y\Delta x$ increment is produced. This causes the overflow in the cumulative value of the $y\Delta x$ increments for the integrator to be positive. Such a positive overflow is indicated by the passage of a signal through the gate circuit 408 and the "or" networks 420 and 422 to the coil 58 for recordation in the channel 24.

It has previously been disclosed that a negative overflow in the cumulative value of the $y\Delta x$ increments can occur. Such a negative overflow can occur only when a negative $y\Delta x$ increment is added to negative indications in the channels 14, 16, 18 and 20. A negative $y\Delta x$ increment for an integrator can result when either $y$ is positive and $\Delta x$ is negative or when $y$ is negative and $\Delta x$ is positive.

The gate circuit 414 is connected to the multivibrators 350 and 404 to become prepared for opening when $y$ is positive and $\Delta x$ is negative. Similarly, the gate circuit 410 receives voltages from the multivibrators 350 and 404 to become prepared for the passage of a signal when $y$ is negative and $\Delta x$ is positive. Signals are able to pass through the gate circuits 410 and 414 only upon the introduction of a relatively high voltage from the gate circuit 424.

The gate circuit 424 is able to open only at pulse position 48 for each integrator because of its connection through the line 340 to the counter 324. Since the gate circuit is also connected to the plate of the left tube in the multivibrator 406, a signal passes through the gate circuit only when the polarity of the indications in the channels 14, 16, 18 and 20 have to be inverted. Because of this requirement for inversion, a signal passing through the gate circuit 424 causes a negative overflow to be inverted into a positive overflow. In this way, the signals passing through the gate circuits 410 and 414 provide an indication of a positive overflow in the cumulative value of the $y\Delta x$ increments for an integrator. These signals pass through the "or" networks 420 and 422 to the coil 58 for recordation in the channel 24.

The operation of the gate circuits 416, 408 and 412 and of the gate circuits 424, 410 and 414 to provide indications of positive overflows in the cumulative $y\Delta x$ increments can be given by the following logical equation:

$$Z_s = P_{48}[(B_2'B_5 + B_2B_5')B_3' + (B_2B_5 + B_2'B_5')B_3)]$$

In the above equation, $Z_s$ = a pulse of relatively high voltage introduced to the coil 58 to indicate a positive overflow in the cumulative value of the $y\Delta x$ increments for an integrator;

$B_3$ = a relatively high voltage on the plate of the left tube in the multivibrator 406 to indicate an inversion in the polarity of the cumulative $y\Delta x$ increments for the integrator;

And $B_2$ and $B_5$ have previously been defined.

In co-pending application Serial No. 217,478, the 48th pulse position for each integrator in the channel containing the $y$ information is utilized to indicate the sign of $y$. This channel corresponds to the channel 16 in the analyzer constituting this invention. In accordance with the operation of the analyzer disclosed in co-pending application 217,478 a positive pulse is provided in the channel 16 in pulse position 48 for each integrator when the value of $y$ for the integrator is negative. Correspondingly, no positive pulse is provided in this pulse position when the value of $y$ is positive.

The components shown in FIGURE 6 are included to determine whether the value of $y$ for each integrator is positive or negative at any instant. This determination is necessary since $\Delta y$ increments are being combined with the value of $y$ for each integrator every time that the integrator is presented for computation. For example, negative $\Delta y$ increments representing a value of $-3$ may be added to a value of $y$ representing a value of $+2$. This causes the new value of $y$ to be $-1$ and requires that the coding pulse representing the sign of $y$ be changed.

The components shown in FIGURE 6 are included to determine the sign of the $y$ information for each integrator. The components include the gate circuits 450, 452 and 454, which are utilized to determine negative values of $y$. The gate circuit 454 opens for the passage of a signal upon the simultaneous introduction of signals from the plates of the left tubes in the multivibrators 280, 393 and 404. Because of its connections, the gate circuit 454 passes a signal when the values of $y$ and $\Delta y$ are both negative and there is a carry. As has previously been disclosed, indications of 1100 are added to the value of $y$ when the cumulative value of the $\Delta y$ increments for an integrator are negative. The gate circuit 454 opens only when a positive carry occurs since the addition of 1100 to any of the negative numbers shown in the chart in FIGURE 12 causes a carry to be obtained. For example, the addition of 1100 to an indication of 1100 representing $-1$ or to an indication of 0100 representing $-9$ causes a carry to be obtained.

The signal passing through the gate circuit 454 is introduced through the "or" network 456 to the grid of the left tube in the multivibrator 276. This signal causes the left tube in the multivibrator 276 to become cut off and a high voltage to be produced on the tube plate. The high voltage from the multivibrator 276 in turn causes the left tube in the multivibrator 244 to become cut off. The resultant high voltage on the plate of the left tube in the multivibrator 244 passes through the "or" network 245a for recordation by the coil 36 in the channel 16. In this way, an indication is provided in the channel 16 that the value of $y$ for the integrator is negative.

Because of its connections to the multivibrators 280, 393 and 404, the gate circuit 450 passes a signal when the value of $y$ for an integrator is positive, the cumulative value of the $\Delta y$ increments for the integrator is negative and there is no carry. Since the cumulative value of the $\Delta y$ increments is negative, an indication of 1100 is added to the value of $y$ for each pulse position after the position of least significance. The addition of 1100 to any positive number between 1 and 9 causes a carry to be produced by the adder 324. These positive numbers are shown in the chart shown in FIGURE 12. For example, the addition of 1100 to an indication of 0100 representing $+1$ causes a carry indication to be obtained.

Since the addition disclosed in the previous paragraph occurs in the pulse positions holding the value of $y$ after the first information position for $y$, a positive number indicative of $y$ represents a value of "10" or more. As has been disclosed, the maximum value of $\Delta y$ increments for an integrator can never be greater than $-7$. The addition of $-7$ to a positive value exceeding 10 still produces a positive number. Under such circumstances, the production of a carry indication indicates that the value of $y$ is still positive.

As will be seen, the addition of 1100 representing negative $\Delta y$ increments to indications of 0011 representing a "0" value of $y$ produces a resultant indication of 1111 in a particular pulse position but no carry. If a carry is obtained from the addition of $y$ and $\Delta y$ in a previous pulse position, this indication of "1" in the least significant position when added to the indication of "1111" causes a carry to be obtained in the particular pulse position. Because of this carry from a previous pulse position, a carry indication can be provided in the position of highest significance as to a positive value of $y$ even though a value of $y$ less than "10" is added to negative $\Delta y$ increments.

When the value of $y$ undergoing computation is less than "10," a carry is obtained in the pulse position of least significance for positive values of $y$ greater in absolute magnitude than the negative value of the $\Delta y$ increments. For example, a carry indication is produced when an indication of 1000 representing a value of $y$ equal to $+5$ is added to an indication of 1001 representing a value of the $\Delta y$ increments equal to $-4$. But a carry indication is not obtained for an addition of 1000 representing a value of $y$ equal to $+5$ and an indication of 0111 representing a value of the $\Delta y$ increments equal to $-6$. As disclosed in the previous paragraph, a carry from the pulse position of least significance causes a carry to be obtained for the pulse position of highest significance even though the value of $y$ in the pulse position of highest significance is represented by an indication of 0011 equal to 0.

In the previous four paragraphs, various possibilities have been discussed to show that a carry is produced when a positive value of $y$ for an integrator is added to a negative value of $\Delta y$ having a magnitude less than the value of $y$. Similarly, no carry is produced when the absolute value of $\Delta y$ for the integrator is greater than the positive value of $y$. In this way, a signal passes through the gate circuit 450 only when the new value of $y$ is negative.

The gate circuit 452 passes a signal to indicate a negative value of $y$ undergoing computation is negative, the cumulative value of the $\Delta y$ increments is positive and there is no carry from a previous pulse position. For positive $\Delta y$ increments, an indication of 0011 is added to the value of $y$ for the pulse positions after the position of least significance. For additions of 0011 to any negative number between "1" and "9," no carry is obtained. This may be seen by the arithmetical combination of 0011 with any of the negative numbers shown in the chart in FIGURE 12.

In case the negative value of $y$ undergoing computation is less than 10, the addition of this number to a positive number having a greater magnitude and representing the $\Delta y$ increments produces no carry. For example, if a value of 0110 representing a value of $\Delta y$ equal to $+3$ is added to any of the indications in FIGURE 14 representing negative values of $y$ equal to 4, 5, 6, or 7, no carry is obtained. In this way, no carry can be transferred from one position to a position of increased significance to cause an output carry to be obtained at the position of increased significance. Because of this, a signal passes through the gate circuit 452 even for negative values of $y$ less than 10, provided that the cumulative value of the $\Delta y$ increments has a positive polarity and an absolute magnitude less than the value of $y$. This signal passes through the multivibrators 276 and 244 and the "or" network 245a for recordation by the coil 36 as a positive indication in the channel 16.

The operation of the gate circuits 450, 452 and 454 can be given by the following logical equation:

$$Y_{sn} = P_{48}(B_2'B_7C_1' + B_2B_7'C_1' + B_2B_7'B_1)$$

In the above equation, $Y_{sn}$ = a pulse of relatively high voltage recorded by the coil 36 in the channel 16 at pulse position 48 for an integrator to indicate that the value of $y$ for the integrator is negative; and $B_2$, $B_7$ and $C_1$ have previously been defined.

The gate circuits 460, 462 and 464 pass signals to indicate positive values of $y$. Because of its connections to the multivibrators 280, 293 and 404, the gate circuit 462 passes signals when the values of $y$ and the $\Delta y$ increments are both positive and there is no carry. As previously disclosed, a positive value of the cumulative $y\Delta x$ increments is represented by an indication of 0011. When this indication is added to any positive value of $y$ between 0 and 9, no carry is obtained.

The signals passing through the gate circuit 462 are introduced through the "or" network 466 to the grid of the right tube in the multivibrator 276. This signal causes the right tube in the multivibrator 276 to become cut off and a relatively high voltage to be produced on the tube plate. The high voltage on the plate of the right tube in the multivibrator 276 is introduced to the grid of the right tube in the multivibrator 244 to cut off the tube. The resultant low voltage on the plate of the left tube in the multivibrator 244 causes a pulse of relatively low voltage to be recorded by the coil 36 in the channel 16 as an indication that the value of $y$ for the particular integrator is positive.

The gate circuit 460 passes a signal when the value of $y$ for an integrator is negative, the cumulative value of the $\Delta y$ increments for the integrator is positive and a carry occurs. Since the cumulative value of the $\Delta y$ increments for the integrator is positive, an indication of 0011 is added to the value of $y$. As has previously been disclosed, the value of $y$ is negative when no carry is obtained by the addition of a negative value of $y$ and a positive value of the $\Delta y$ increments. Inversely, the value of $y$ becomes positive when a carry is obtained.

The new value of $y$ is also positive when a positive value of $y$ is added to a negative value of the cumulative $y\Delta x$ increments and a carry is obtained. The new value of $y$ is positive for a positive carry since the value of $y$ is negative when no carry occurs. Upon the occurrence of a positive value of $y$ under such a set of conditions, a signal passes through the gate circuit 462 and the "or" network 466 to the grid of the right tube in the multivibrator 276. This signal causes a pulse of relatively low voltage to be recorded by the coil 36 in the channel 16.

The operation of the gate circuits 460, 462 and 464 can be given by the following logical equation:

$$Y_{sn}' = P_{48} \ (B_2 B_7' C_1' + B_2' B_7' C_1' + B_2' B_7 C_1)$$

In the above equation, $Y_{sn}'$ = a pulse of relatively low voltage recorded by the coil 36 in the channel 16 at pulse position 48 for an integrator to indicate that the value of $y$ for the integrator is positive; and $B_2$, $B_7$ and $C_1$ have previously been defined.

In FIGURE 17, a chart is shown of the indications which may be provided by the various stages when the cumulative value of $y\Delta x$ for an integrator is to be multiplied by a value of "2." The first column in the chart indicates the possible values for the decimal digit at pulse position 47 for an integrator. As may be seen, these values may vary between "0" and "+9" in the positive direction and between "0" and "−5" in the negative direction. The values are obtained by the arithmetical combination of values of $y$ between "+5" and "−5" with values of $y\Delta x$ between "0" and "+4." Only values of $y\Delta x$ between "0" and "4" appear since an overflow occurs at a value of "+5" and since the cumulative value of $y\Delta x$ is represented only by positive number. In the second vertical column, the indications representing in binary form the decimal values in the first column are shown. These indications are designated in FIGURE 17 by $x_1$, $x_2$, $x_3$ and $x_4$ and are represented in the drawings by the inputs from the adder 324 to the grids of the left tubes in the multivibrators 272, 274, 276 and 278, respectively. The third column represents the carry which is introduced from the added 324 to the multivibrator 278 at pulse position 47 when the adder produces at this pulse position indications corresponding to the values shown in the first column. The indications introduced from the adder 324 to the multivibrator 278 is represented as $c_c$ in column 3 of FIGURE 17.

As previously disclosed, the addition of two numbers in the "excess three" code requires that a value of "3" be subtracted from the value obtained by the addition when no carry is produced by the addition. It has also been previously disclosed that a value of "+3" is added to the result obtained when a carry occurs in the addition of the two numbers. In addition to these corrective values, a factor of "5" must be sometimes provided when the cumulative value of $y\Delta x$ for an integrator is to be multiplied by "2." For example, a value of "−5" is subtracted from the cumulative value of $y\Delta x$ when the cumulative value at pulse position 47 is equal to or greater than "5." The value of "5" is subtracted since an overflow pulse is produced in the channel 22 in a manner which will be disclosed in detail hereafter.

Since no carry is introduced from the adder 324 to the multivibrator 278 for cumulative values of $y\Delta x$ between "5" and "9," the normal corrective factor of "−3" is added to the corrective factor of "−5" to obtain a corrective factor equal to a decimal value of "−8," as shown in column 5 of FIGURE 17. This corrective factor is provided by the multivibrators 292, 286, 288 and 290 which are respectively designated in FIGURE 17 as $Y_1$, $Y_2$, $Y_3$ and $Y_4$.

For cumulative values of $y\Delta x$ between "0" and "+4," a corrective factor of "5" is not provided since no overflow in the channel 22 occurs. When positive values of $y$ are added to positive values of $y\Delta x$ to produce a positive value between "0" and "4" at pulse position 47, no carry is introduced from the adder 324 to the multivibrator 278 at this position, as shown in column 3 of FIGURE 17. This causes a corrective factor equal to "−3" in decimal form to be provided by the multivibrators 292, 286, 288 and 290 representing $Y_1$, $Y_2$, $Y_3$ and $Y_4$. However, upon the addition of a negative value of $y$ to a positive value of $y\Delta x$ to produce a new value between "0" and "+4" at pulse position 47, a carry occurs from the adder 324 to the multivibrator 278 at this position. Because of this carry, a corrective factor equal to "+3" in decimal form is provided by the multivibrators 292, 286, 288 and 290, as shown in columns 4 and 5 of FIGURE 17.

In like manner, a corrective value of "+5" in decimal form is added to the cumulative value of $y\Delta x$ at pulse position 47 when the cumulative value of $y\Delta x$ at this position is negative. A value of "+5" is added since a negative value of $y\Delta x$ indicates that an overflow in the negative direction has occurred for the cumulative value of $y\Delta x$. Since a negative overflow in the channel 22 is indicative of a value of "−5" when the output is to be multiplied by "2," a corrective factor of "−5" is added to return the cumulative value of $y\Delta x$ to its proper value. In addition, a value equal to a corrective factor of "+3" in decimal form is also added since the cumulative value of $y\Delta x$ is negative and no overflow has occurred. This corrective factor has previously been disclosed in detail. As a result, a total corrective factor of "+8" in decimal form is added to the cumulative value of $y\Delta x$ for negative values between "−1" and "−5," inclusive. This corrective factor is shown in columns 4 and 5 of FIGURE 17.

In columns 6 and 7 of FIGURE 17, the cumulative value of $y\Delta x$ is shown after the corrective factor in the multivibrators 292, 286, 288 and 290 has been added to the indications passing from the adder 324 to the multivibrators 272, 274, 276 and 278, respectively. The decimal value is shown in FIGURE 7, and the binary indications recorded in the channels 14, 16, 18 and 20 are shown in column 6. These binary indications are respectively recorded in the channels 14, 16, 18 and 20 in accordance with the pattern appearing in the multivibrators 244, 398, 399 and 250. These multivibrators are respectively designated as $O_1$, $O_2$, $O_3$ and $O_4$ in FIGURE 17.

Similarly, the chart in FIGURE 18 indicates the possible values which may be obtained for the different parameters when the cumulative value of $y\Delta x$ for an integrator is to be multiplied by "5." As in FIGURE 17, the first column in FIGURE 18 indicates in decimal form the uncorrected value of the $y\Delta x$ increments at pulse position 47 for an integrator. The second column illustrates how the signals passing from the adder 324 to multivibrators 272, 274, 276 and 278 and representing $x_1$, $x_2$, $x_3$ and $x_4$ indicate these values in binary form. The third column indicates the carry which is introduced from the adder 324 to the multivibrator 278 at pulse position 47 when the cumulative values of $y\Delta x$ in columns 1 and 2 are produced at this position.

Columns 4 and 5 of FIGURE 18 indicate the corrective factor which must be combined with the values in columns 1 and 2 to return the indications in column 1 and 2 to the proper values in the "excess three" code. As may be seen, decimal corrections of either "3" or "5" are provided. The corrective factor of "3" for indications of $y\Delta x$ at position 47 equal in decimal form to "0" or "1" have been previously disclosed in detail. In addition, a corrective factor of "−2" is provided for values of $y\Delta x$ equal to "+2" or "+3" and a corrective factor of "+2" is provided for values of $y\Delta x$ equal to "−1" or "−2." This corrective factor of "2" is similar to the corrective factor of "5" which is provided for certain indications shown in FIGURE 17.

The proper values of $y\Delta x$ at pulse position 47 for an integrator are indicated in binary form in column 6 and in decimal form in column 7 of FIGURE 18. These results are obtained by the arithmetical combination of the indications in columns 2 and 4 of FIGURE 18. The indications provided in column 6 are recorded in the channels 14, 16, 18 and 20 to serve as the new cumulative value of the $y\Delta x$ increments at pulse position 47. At the same time, indications representing an overflow in the cumulative value of the $y\Delta x$ increments are recorded in the channel 22 for the integrator in accordance with the indications in column 8. A pulse of high voltage is recorded in the channel 22 at pulse position 48 for the integrator for values of "+1" or "−1" in column 8, and a pulse of low voltage is recorded for indications of "0" in column 8.

Multiplication of the cumulative value of the $y\Delta x$ increments for an integrator by a factor of "2" is controlled by the presence or absence of a pulse in the channel 14 at pulse position 48 for the integrator. The presence of a positive pulse in this pulse position for an integrator provides an indication that the cumulative value of the $y\Delta x$ increments for the integrator is to be multiplied by a decimal factor of "2." The absence of a pulse in this pulse position indicates that multiplication by "2" is not to occur.

When a positive pulse appears in the channel 14 at pulse position 48 for an integrator, it passes through the gate circuit 492 since the gate circuit opens at this pulse position because of its connection through the line 340 to the counter 234. The pulse is then recorded by the coil 30 in the channel 14. In this way, the pulse is recirculated in the channel 14 to produce a multiplication of the cumulative value of the $y\Delta x$ increments for the integrator every time that the integrator is presented for computation.

Similarly, the appearance of a positive pulse in the channel 20 at pulse position 48 for an integrator provides an indication that the cumulative value of the $y\Delta x$ increments for the integrator is to be multiplied by "5." This pulse passes through the gate circuit 494 to the coil 48. The indication is then recorded by the coil 48 in the channel 20. By such recirculation, the positive pulse is retained in the channel 20 at pulse position 48 to control multiplication of the $y\Delta x$ increments by "5" every time that the integrator is presented for computation.

FIGURE 7 illustrates the circuits required to produce the corrective factors indicated in column 4 of FIGURES 17 and 18. As previously disclosed, this corrective factor is provided by the multivibrators 292, 286, 288 and 290. As will be seen in the chart shown in FIGURE 17, the multivibrator 292 should provide an indication of "0" for values between "+5" and "+9," inclusive, and between "−1" and "−5," inclusive, when the cumulative value of the $y\Delta x$ increments for an integrator is to be multiplied by "2."

For values of only "+6" to "+9," inclusive, and of only "−1" to "−4," inclusive, the signals passing from the adder 324 to the multivibrators 276 and 278 and representing $x_3$ and $x_4$ represent binary indications of "1." This is indicated in column 2 of FIGURE 17. For values of only "+5" and "−5," the signals passing from the adder 324 to the multivibrators 272, 274 and 278 and representing $x_1$, $x_2$ and $x_4$ provide binary indications of "1." For this reason, the operation of the right tube in the multivibrator 292 is controlled by the logical expression $Y_1' = P_{48}b_1x_4x_3 + P_{48}b_1x_4x_2x_1$, where $b_1$ = a high voltage induced in the coil 30.

Because of the connections made to its input terminals, the gate circuit 470 passes a signal only when $P_{48}b_1x_4x_3$ is true. Similarly, the gate circuit 474 passes a signal only when $P_{48}b_1x_4x_2x_1$ is true. These signals pass through the "or" network 472 to the grid of the right tube in the multivibrator 292 to trigger the tube into a state of non-conductivity.

As will be seen in columns 3 and 4 of FIGURE 17, the multivibrator 286 representing $Y_2$ should provide a binary indication of "1" only when a signal passes from the adder 324 to the carry multivibrator 282 to represent a binary indication of "1." As shown in FIGURE 18, representing $Y_2$ the multivibrator 286 should also provide a binary indication of "1" for integrators requiring a multiplication by "5" when a signal passes from the adder 324 to the carry multivibrator 282 to represent a binary indication of "1." In addition, for integrators providing a multiplication by "5," the multivibrator 286 should provide a binary indication of "1" only in those instances when a signal representing $x_3$ passes from the adder 324 to the multivibrator 276 to provide a binary indication of "0."

In order for the multivibrator 286 to operate as disclosed above, its operation is controlled by the logical equation $Y_2 = C_c + P_{48}b_4x_3'$, where $b_4$ = a relatively high voltage induced in the coil 48. The indication $P_{48}b_4x_3'$ is provided by the gate circuit 482 because of its connections to the appropriate stages. The output signals from the gate circuits 478 and 482 pass through the "or" network 285 to the grid of the left tube in the multivibrator 286 so as to trigger the multivibrator into a state of non-conductivity.

It will be seen in FIGURE 17 that the multivibrator 288 representing $Y_3$ should provide a binary indication of "0" for decimal values between "+5" and "+9," inclusive, and between "−1" and "−5," inclusive. The multivibrator 288 should also provide a binary indication of "0" for decimal values between "0" and "+4" when these values are obtained by the arithmetical combination of $y\Delta x$ and a negative value of the dependent quantity $y$. For decimal values of only "+6" and "+9," inclusive and "−1" to "−4," inclusive, the signals passing from the adder 324 to the multivibrators 276 and 278 and representing $x_3$ and $x_4$ have binary indications of "1."

For values of only "+5" and "−5" in column 1 of FIGURE 17, the signals passing from the adder 324 to the multivibrators 272, 276 and 278 and representing $x_1$, $x_2$ and $x_4$ have binary indications of 1. Only when values between "0" and "4," inclusive, are obtained through the arithmetical combination of $y\Delta x$ and a negative value of $y$, a carry signal is introduced from the adder 324 to the multivibrator 282. This carry signal should control the binary indication of "0" in the multivibrator 288. The chart shown in FIGURE 18 illustrates that the multivibrator 288 representing $Y_3$ should provide a binary indication of "0" only when a signal representing $x_3$ passes from the adder 324 to the multivibrator 276 to provide a binary indication of "0."

Because of the requirements set forth in the charts shown in FIGURES 17 and 18 and disclosed above, the operation of the multivibrator 288 is controlled by the logical equation:

$$Y_3' = C_c + P_{48}b_1x_4x_3 + P_{48}b_1x_4x_2x_1 + P_{48}b_4x_3'$$

As previously disclosed, the gate circuit 470 passes a signal only when $P_{48}b_1x_4x_3$ is true and the gate circuit 474 passes a signal only when $P_{48}b_1x_4x_2x_1$ is true. Similarly, the gate circuit 482 passes a signal representing $P_{48}b_4x_3'$ because of its different connections to proper stages.

The signals passing through the gate circuits 470, 474 and 482 are applied through the "or" network 287 to the grid of the right tube in the multivibrator 288 to trigger the tube into a state of non-conductivity. A signal also passes through the "or" network 287 from the plate of the left tube in the multivibrator 282 when a high voltage is produced on the tube plate to indicate that a carry has occurred.

The chart illustrated in FIGURE 17 shows that the multivibrator 290 representing $Y_4$ should have a binary indication of "0" when the value of $y\Delta x$ is arithmetically combined with a negative value of $y$ to produce a positive value between "0" and "+4." The chart also shows that a signal representing $C_c$ passes from the adder 324 to the carry multivibrator 282 to provide a binary indication of "1" for only these values. In accordance with the chart shown in FIGURE 18, the multivibrator 290 should also have a binary indication of "0" when a signal passes from the adder 324 to the multivibrator 282 to provide a binary indication of "1." In addition, the multivibrator 290 should have a binary indication of "0" for negative values of "1—" and "—2," as shown in column 1 of FIGURE 18. Since the multivibrators 276 and 278 representing $x_3$ and $x_4$ have received positive signals from the adder 324 only for values of "1—" and "—2" in column 1, these signals should control the operation of the multivibrator 290.

Because of the logic disclosed in the previous paragraph, the operation of the multivibrator 290 can be controlled in accordance with the logical equation $$Y_4' = c_c + P_{48}b_4x_4x_3$$

Because of the particular connections to the gate circuit 490, the gate circuit passes a signal only when $P_{48}b_4x_4x_3$ is true. The signals from the gate circuit 490 pass through the network 289 to the grid of the right tube in the multivibrator 290 and trigger the tube into a state of non-conductivity. Signals also pass through the "or" network 289 from the plate of the left tube in the multivibrator 282 to trigger the right tube in the multivibrator 290 into a state of non-conductivity upon the occurrence of a carry indication. Signals also pass through the "or" network 289 from the counter 234 at pulse position 1 of each integrator to prepare the multivibrator 290 for proper operation in the subsequent pulse positions of the integrator.

As may be seen in columns 1 and 8 of FIGURE 17, an overflow signal should be recorded in the channel 22 for decimal values between "+5" and "+9," inclusive, and between "—1" and "—5," inclusive. For only the decimal values between "+6" and "+9," inclusive, and between "—1" and "—4," inclusive, signals representing $x_3$ and $x_4$ pass from the adder 324 to both the multivibrators 276 and 278 to provide binary indications of "1." For only the decimal values "+5" and "—5," the signals representing $x_1$, $x_2$ and $x_4$ pass from the adder 324 to the multivibrators 272, 274 and 278 to provide binary indications of "1." FIGURE 18 shows that an overflow should occur in the channel 22 only when a signal representing $x_4$ passes from the adder 324 to the multivibrator 278 to provide a binary indication of "1."

Because of the logic discussed above, a positive pulse should be recorded in the channel 22 at pulse position 48 for an integrator in accordance with the logical expression $$Z = P_{48}B_6B_1X_4X_3 + P_{48}B_6B_1X_4X_2X_1 + P_{48}B_6B_4X_4$$

The term $B_6$ is included since it indicates that $\Delta x$ increment has actually occurred. As previously disclosed, an overflow can occur only upon the actual occurrence of a $\Delta x$ increment since the cumulative value of the $y\Delta x$ increments cannot be changed without such an occurrence.

Because of the particular connections that are made to its input terminals, the gate circuit 443 (FIGURE 5) can pass a signal only when $P_{48}B_6B_1X_4X_3$ is true. The signals from the gate circuit 443 pass through the "or" networks 434 and 436 to the coil 52 for recordation as a positive signal in the channel 22. Similarly, the gate circuit 444 is able to pass a signal to the coil 52 only when $P_{48}B_6B_1X_4X_2X_1$ is true. A signal can pass through the gate circuit 445 only for an actual occurrence of $P_{48}B_6B_4X_4$ because of the particular connections made to the gate circuit. The signals from the gate circuits 444 and 445 also pass through the "or" networks 434 and 436 to the coil 52 for recordation as a positive signal in the channel 22.

As will be seen, the logical equation for the introduction of information into the Z line includes such terms as $B_1$, $B_6$, $X_1$, $X_2$, $X_3$ and $X_4$ for the integrators which provide a multiplication of the $y\Delta x$ increments by either "2" or "5." These terms represent the output from the multivibrators 202, 214, 272, 274, 276 and 278. However, the logical equations controlling the operation of the multivibrators 292, 286, 288 and 290 representing $Y_1$, $Y_2$, $Y_3$ and $Y_4$ include such terms as $b_1$, $b_6$, $x_1$, $x_2$, $x_3$ and $x_4$. These terms represent the inputs to the multivibrators 202, 214, 272, 274, 276 and 278.

Because of the inherent operation of the multivibrators, the input signals to the multivibrators occur a pulse position before the corresponding output signals from the multivibrators. For example, a signal 6, introduced to the multivibrator 202 at one pulse position causes a signal $B_1$ to be produced by the multivibrator at the next pulse position. The input signals to the various multivibrators are used to control the operation of $Y_1$, $Y_2$, $Y_3$ and $Y_4$ in order to produce a proper sequence of operation of $Y_1$, $Y_2$, $Y_3$ and $Y_4$ in synchronization with the operation of the other components in the analyzer.

The system disclosed above has several important advantages. Since the values of $y$ and the cumulative value of $y\Delta x$ for each integrator are recorded in decimal form, these values can be easily determined for each integrator. Furthermore, the recordation of $y$ and $y\Delta x$ for each integrator in the channels 14, 16, 18 and 20 on a decimal basis causes the capacity of the analyzer to be increased with no material increase in the time required for the analyzer to solve a mathematical problem.

The analyzer also has the advantage of providing a considerable flexibility in its operation while it computes on a decimal basis. This results from the operation of the analyzer in multiplying decimal values by such integers as "2" or "5." Because of such possible multiplications, an overflow in the cumulative value of $y\Delta x$ for each integrator can occur from the channel 20 into the channels 22 and 24 for such values as 2, 5, 10, 20, 50, 100, etc. This causes the possibilities of overflow in the decimal system to approach those in the binary system, where overflows can occur for such values as 2, 4, 8, 16, 24, 32, 64, 128, etc.

In co-pending application Serial No. 324,726, filed December 8, 1953, now Patent No. 2,923,470, by Robert E. Beck et al., a system is disclosed for determining the initial value of y for different integrators. This system requires that certain values be varied by the arithmetical combination of incremental values. Furthermore, in copending application Serial No. 390,506, filed November 6, 1953, by Glenn E. Hagen et al., a system is disclosed for providing a correction to the value of y for each integrator over the range of each $\Delta x$ increment. This correction is produced by obtaining a particular function of the cumulative $y\Delta x$ increments during the time that $a\Delta x$ increment is being produced.

It should be appreciated that the particular systems disclosed in the two co-pending applications mentioned in the previous paragraph can also be included in the system disclosed and claimed in this application. Instead of recording the value of y for each integrator in alternate pulse positions in the channels 14, 16, 18 and 20, the value of y can be recorded in every 4th position in the channels. Similarly, the value of $y\Delta x$, the initial value of y and the correction in the valve of y can be recorded in every 4th position on a recurring basis. These values can be presented on a sequential basis to the adders 324 in a manner similar to that in which the values of y and $y\Delta x$ are alternately presented as disclosed above. In such a system, the advantages of parallel decimal operation and of multiplication of the decimal values by "2" or "5" would be even greater than in the simplified analyzer disclosed above.

It should be further appreciated that a system of parallel decimal operation and of multiplication of the decimal values by "2" or "5" in a manner similar to that disclosed above can be included in other digital differential analyzers than that disclosed in co-pending application Serial No. 217,478. For example, the system disclosed above can be easily adapted for use with the digital differential analyzer disclosed in co-pending application Serial No. 263,152, filed December 26, 1951, now Patent No. 2,850,232, by Glenn E. Hagen et al.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A differential analyzer having: a plurality of integrators, each comprising; a first register means for accumulating signal-represented variations in a dependent quantity of a mathematical function; a second register means with a plurality of parallel output connections at predetermined intervals; transfer means adapted to receive signal-represented variations in an independent quantity of said mathematical function, said transfer means functioning to form and transfer to said second register means, signal-represented values proportional to the product of the value registered in said first register and said variation in an independent quantity upon each occurrence of said signal-represented variation in an independent quantity; overflow means for forming overflow signals at a time when the value in one of said second register means reaches a predetermined level; first program means for interconnecting said integrators whereby overflow signals from predetermined integrators are applied as signal-represented variations to other integrators; and second program means for effectively increasing the magnitude of said signal-represented product values registered in the second register means of certain of said integrators by a predetermined factor, said second program means selecting one of said predetermined output connections whereby to accelerate the production of overflow signals from said certain integrators.

2. Apparatus according to claim 1 wherein said registers comprise segments of a magnetic drum; means for revolving said drum; and means for recording and sensing digital signals to said drum.

3. Apparatus according to claim 2 wherein said integrators operate in sequence and said second program means comprises plural register means associated with said integrators to register program signals for indicating the contents of the second register means in an integrator shall be increased.

4. Apparatus according to claim 2 wherein said registers are binary digital registers, and wherein said predetermined factor may be two or five to thereby facilitate decimal scaling of said differential analyzer.

References Cited in the file of this patent

UNITED STATES PATENTS

| | | |
|---|---|---|
| 2,834,543 | Burkhart | May 13, 1958 |
| 2,841,328 | Steele et al. | July 1, 1958 |
| 2,850,232 | Hagen et al. | Sept. 2, 1958 |

FOREIGN PATENTS

| | | |
|---|---|---|
| 1,055,460 | France | May 5, 1952 |

OTHER REFERENCES

"A New Type of Differential Analyzer," by Bush and Caldwell, Journal of the Franklin Institute, vol. 240, No. 4, October 1945, pages 255–326.

Blume: "Predetermined Counters," Electronics, February 1948, pages 88–93.

Mathematical Tables and Other Aids to Computation, vol. VI, No. 37, January 1952 (MTAC–2), pages 41–53.

Mathematical Tables and Other Aids to Computation, vol. VI, No. 38, pages 102–112 (MTAC–1), April 1952.

Palevsky: Design of the Bendix Digital Differential Analyzer, Proceedings of the I.R.E., October 1953, pages 1352 to 1356.